United States Patent
Itoh

[11] Patent Number: 5,274,504
[45] Date of Patent: Dec. 28, 1993

[54] ZOOM LENS

[75] Inventor: Yoshinori Itoh, Kanagawa, Japan

[73] Assignee: Canon Kabushiki Kaisha, Tokyo, Japan

[21] Appl. No.: 45,305

[22] Filed: Apr. 12, 1993

Related U.S. Application Data

[63] Continuation of Ser. No. 755,311, Sep. 5, 1993, abandoned.

[30] Foreign Application Priority Data

Sep. 14, 1990 [JP] Japan ................................ 2-244694
Oct. 17, 1990 [JP] Japan ................................ 2-278420
Oct. 17, 1990 [JP] Japan ................................ 2-278421

[51] Int. Cl.$^5$ .................................... G02B 15/16
[52] U.S. Cl. .................................... 359/676; 359/689; 359/745; 359/747
[58] Field of Search ............... 359/686, 689, 745, 747, 359/748, 676

[56] References Cited

U.S. PATENT DOCUMENTS

| | | | |
|---|---|---|---|
| 4,757,336 | 7/1988 | Nakayama et al. | 359/689 |
| 4,934,794 | 6/1990 | Ueda | 359/689 |
| 5,055,868 | 10/1991 | Itoh et al. | 354/222 |
| 5,062,695 | 11/1991 | Iwasaki | 359/689 |
| 5,078,481 | 1/1992 | Nakayama et al. | 359/676 |
| 5,111,338 | 5/1992 | Nakayama | 359/686 |

FOREIGN PATENT DOCUMENTS 63-271214 11/1988 Japan.
64-72114 3/1989 Japan.

Primary Examiner—Paul M. Dzierzynski
Assistant Examiner—Kim-Kwok Chu
Attorney, Agent, or Firm—Fitzpatrick, Cella, Harper & Scinto

[57] ABSTRACT

A simple zoom lens is disclosed having lens units of negative, positive and negative powers in this order from the object side, zooming from the wide-angle end to the telephoto end being performed by moving each lens unit toward the object side, and at least the leading negative and positive lens units each consisting of one lens.

18 Claims, 16 Drawing Sheets

ZOOM LENS

This application is a continuation of application Ser. No. 07/755,311 filed Sep. 5, 1993 now abandoned.

BACKGROUND OF THE INVENTION

1. Field of the Invention

This invention relates to zoom lenses of simple structure for photography and, more particularly, to a zoom lens of simple structure having three lens units in total with the lens unit of negative refractive power leading, in which the construction and arrangement of the lenses of these three lens units are properly designed and the air separations between any successive two of these three lens units are varied to vary the magnification, having an F-number of about 4–4.5, a ratio of magnification variation of about 2.4–3, being of small size with a short total lens length and getting a good optical performance.

2. Description of the Related Art

The zoom lens comprising, from front to rear, a first lens unit of negative refractive power, a second lens unit of positive refractive power and a third lens unit of negative refractive power, these three lens units being made to move to vary the magnification has been proposed in, for example, Japanese Laid-Open Patent Applications Nos. Sho 63-271214 and Sho 64-72114.

This type of zoom lens is amenable to increase the maximum angle of view to a relatively large value and, therefore, has found its use in many wide-angle photographic systems.

In the same publications, the first, second and third lens units are made to move under certain conditions when varying the magnification, and the construction and arrangement of the lenses of the three lens units are specified. Thus, the variation of aberrations with zooming is well corrected for a high optical performance, as the zoom ratio is 2 to 3 and the total number of lens elements is 8 or 9 in a relatively compact form. The zoom lens which is suited particularly to the lens-shutter camera is thus achieved.

The zoom lens proposed in the above-described Japanese Laid-Open Patent Applications Nos. Sho 63-271214 and Sho 64-72114 has its lens units each constructed from two or more lens elements to correct, for example, chromatic aberrations in itself, while a shortening of the optical total length (the distance from the first lens surface to the focal plane) is made by strengthening the refractive power of each lens unit.

SUMMARY OF THE INVENTION

The present invention utilizes the refractive power arrangement of the previously proposed zoom lens and further improves the lens design for each lens unit. An object of the invention is to provide a zoom lens of which the number of lens elements is reduced to an ultimately possible minimum and which has a zoom ratio of about 2.4–3, an F-number of about 4–4.5 and a good optical performance over the entire range of variation of the magnification, particularly suited to the lens-shutter camera.

Another object is to provide a zoom lens having a flare cut stop arranged in the lens units to remove harmful light, by which a better optical performance is got.

BRIEF DESCRIPTION OF THE DRAWINGS

In the sectional views of the lenses, FIGS. 1(A), 2(A), 5(A), 6(A), 7(A), 10(A) and 11(A), FIGS. 1(B), 2(B), 5(B), 6(B), 7(B), 10(B) and 11(B), and FIGS. 1(C), 2(C), 5(C), 6(C), 7(C), 10(C) and 11(C) show the lens arrangements in the wide-angle end, an intermediate position and the telephoto end, respectively, I, II, III and IV designate successively a first lens unit, a second lens unit, a third lens unit and a fourth lens unit, and the arrows indicate the moving directions of the lens units during zooming from the wide-angle end to the telephoto end.

In the graphs of the aberrations, FIGS. 3(A), (A), 8(A), 9(A), 12(A) and 13(A), FIGS. 3(B), 4(B), 8(B), (B), 12(B) and 13(B), and FIGS. 3(C), 4(C), 8(C), 9(C), 2(C) and 13(C) show the various aberrations in the wide-angle end, the intermediate position and the telephoto end, respectively, d stands for the d-line, g for the g-line and S.C. for the sine condition, and $\Delta S$ represents the sagittal image surface and $\Delta M$ the meridional image surface.

DETAILED DESCRIPTION OF THE PREFERRED EMBODIMENTS

Figure 1A:
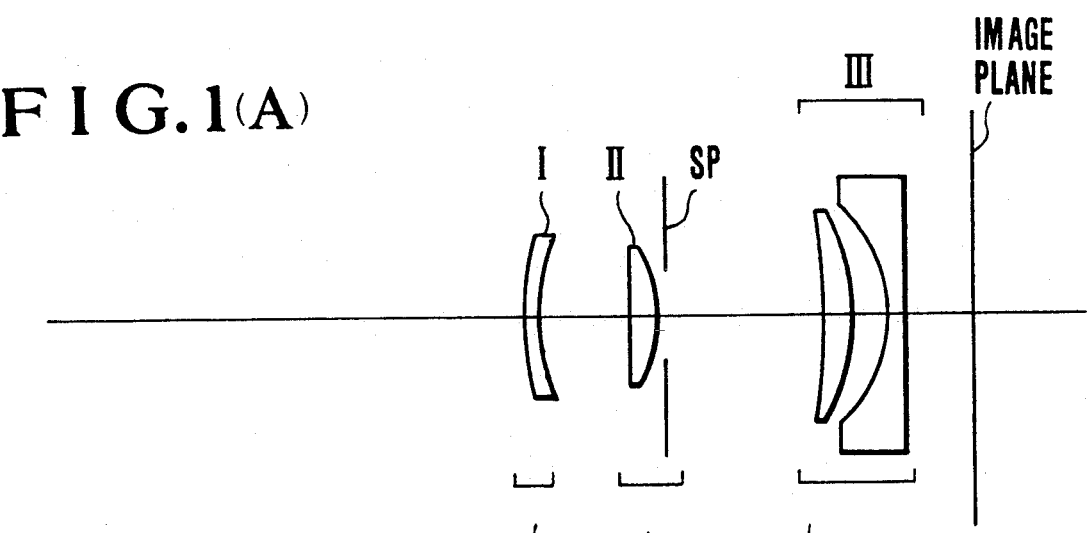
FIGS. 1(A), 1(B) and 1(C), FIGS. 2(A), 2(B) and 2(C), FIGS. 6(A), 6(B) and 6(C), FIGS. 7(A), 7(B) and 7(C), FIGS. 10(A), 10(B) and 10(C), and FIGS. 11(A), 11(B) and 11(C) are sectional views of numerical examples 1 to 6 of lenses of the invention, respectively.
Figure 1B:
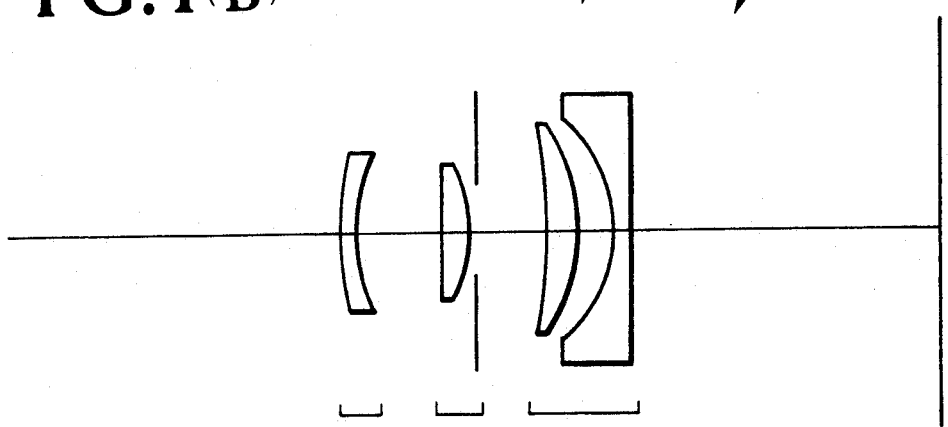
Figure 1C:
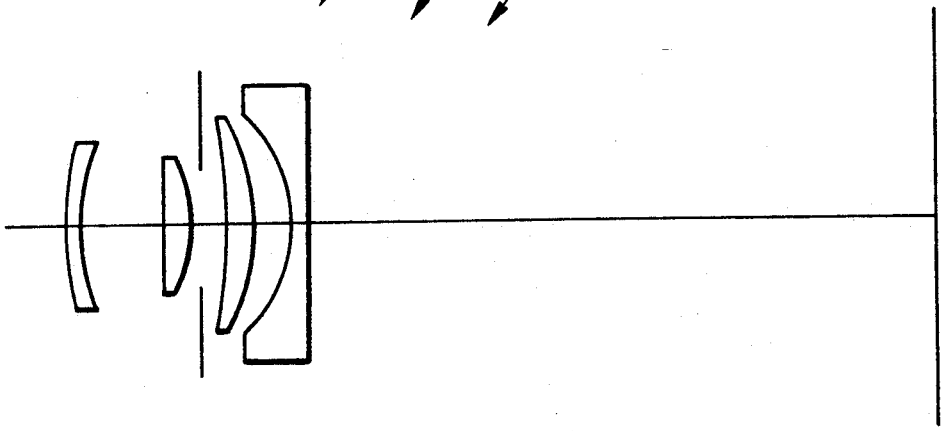
Figure 2A:
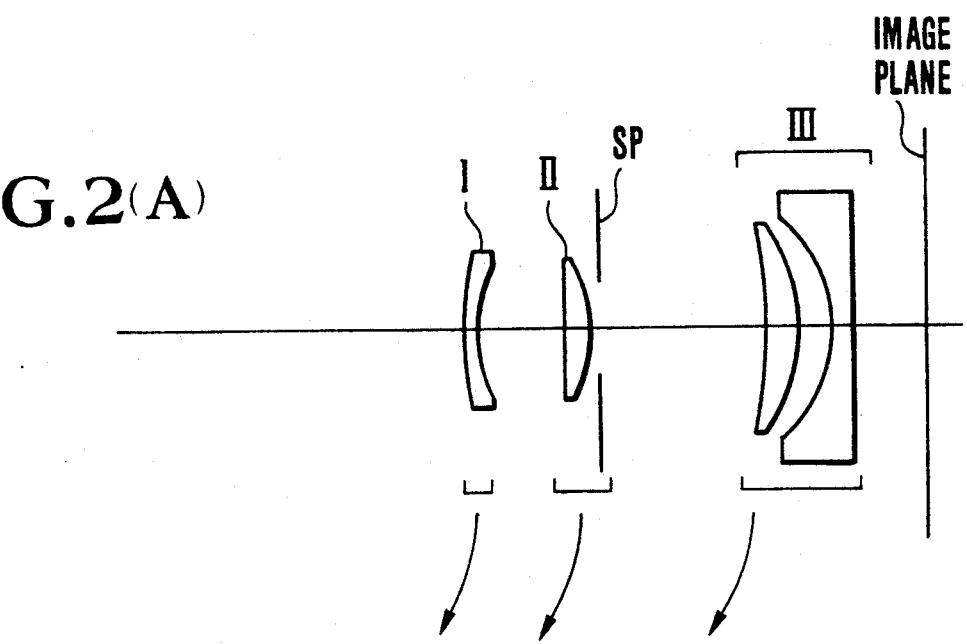
Figure 2B:
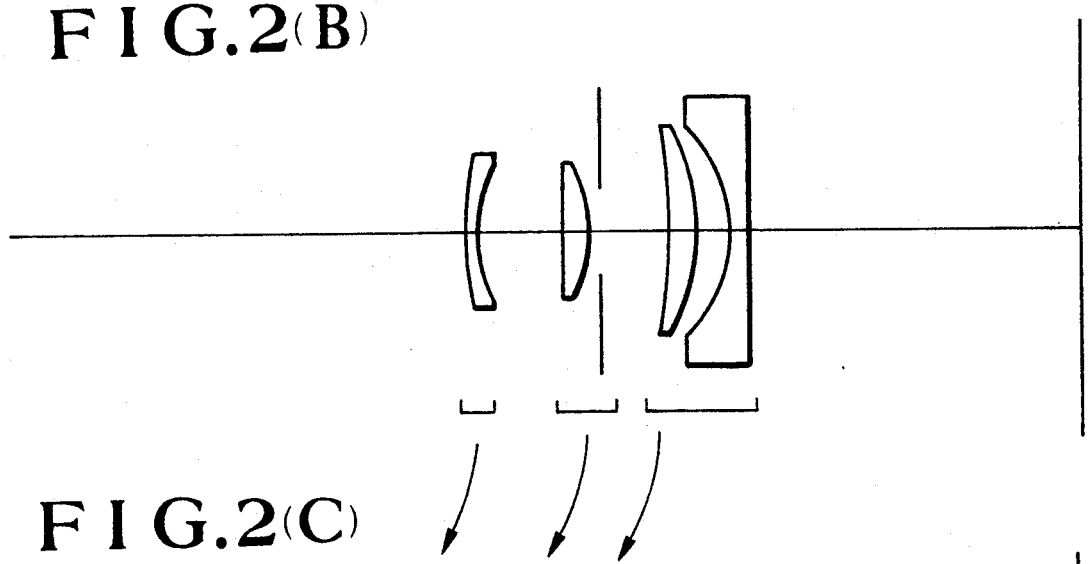
Figure 2C:
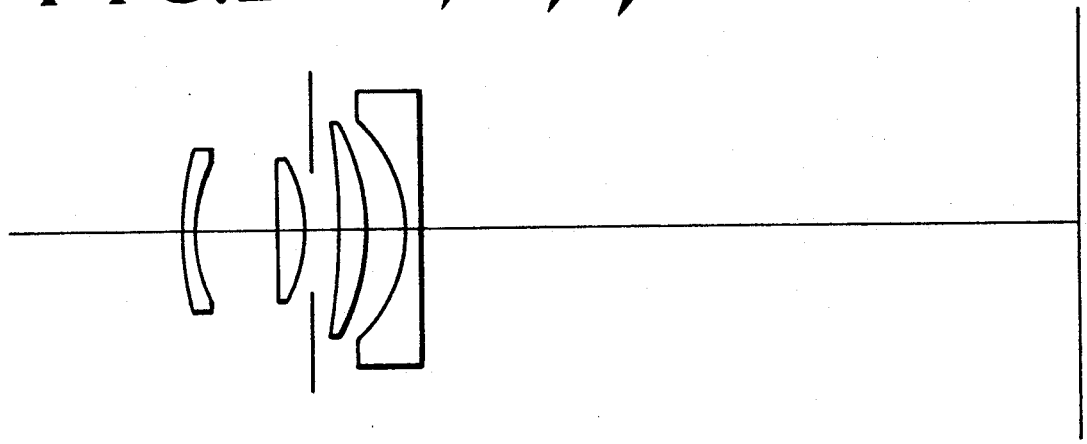
Figure 3A:
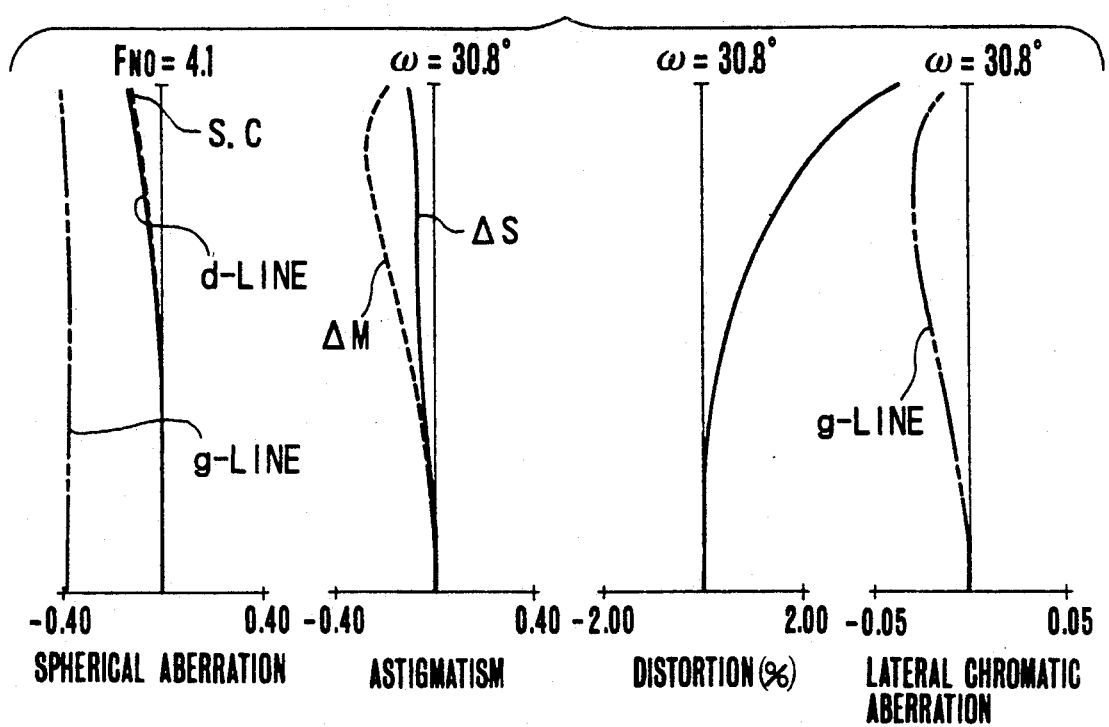
FIGS. 3(A), 3(B) and 3(C), FIGS. 4(A), 4(B) and 4(C), FIGS. 8(A), 8(B) and 8(C), FIGS. 9(A), 9(B) and 9(C), FIGS. 12(A), 12(B) and 12(C), and FIGS. 13(A), 13(B) and 13(C) are graphs of the various aberrations of the numerical examples 1 to 6 of the invention, respectively.
Figure 3B:
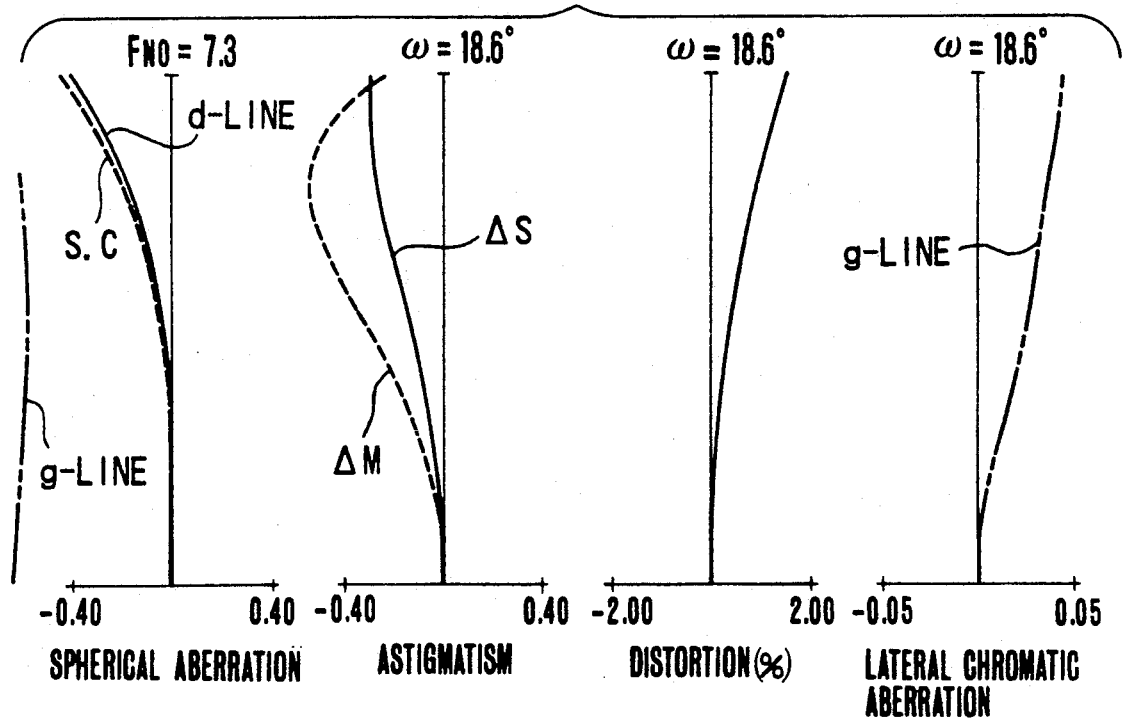
Figure 3C:
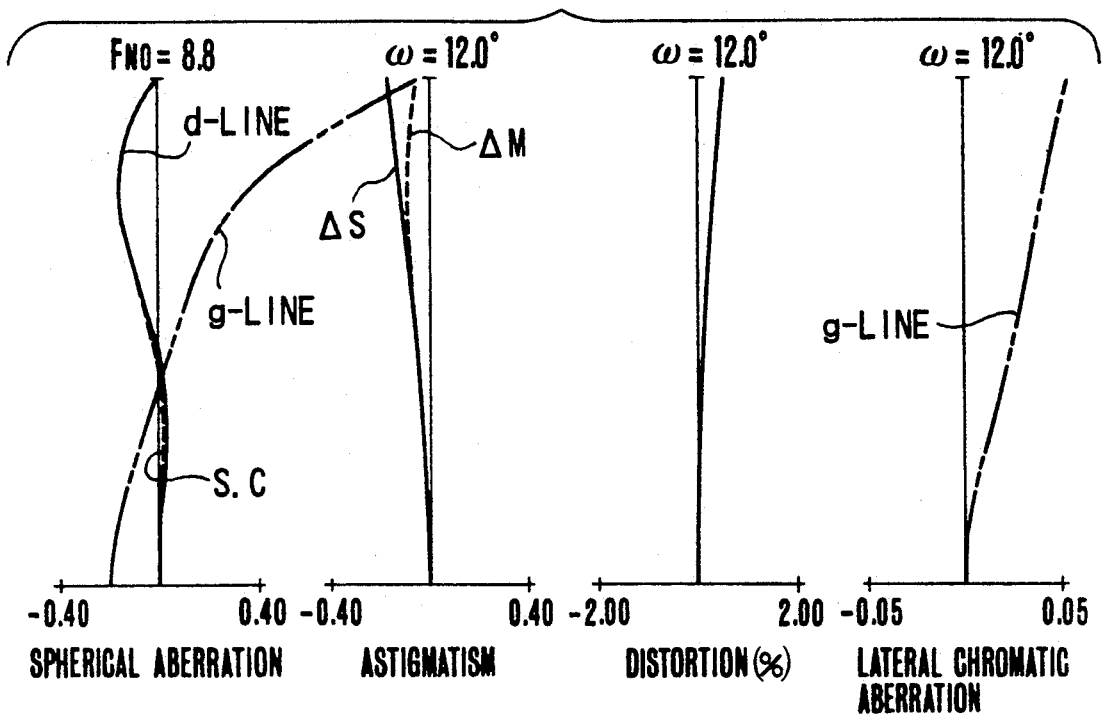
Figure 4A:
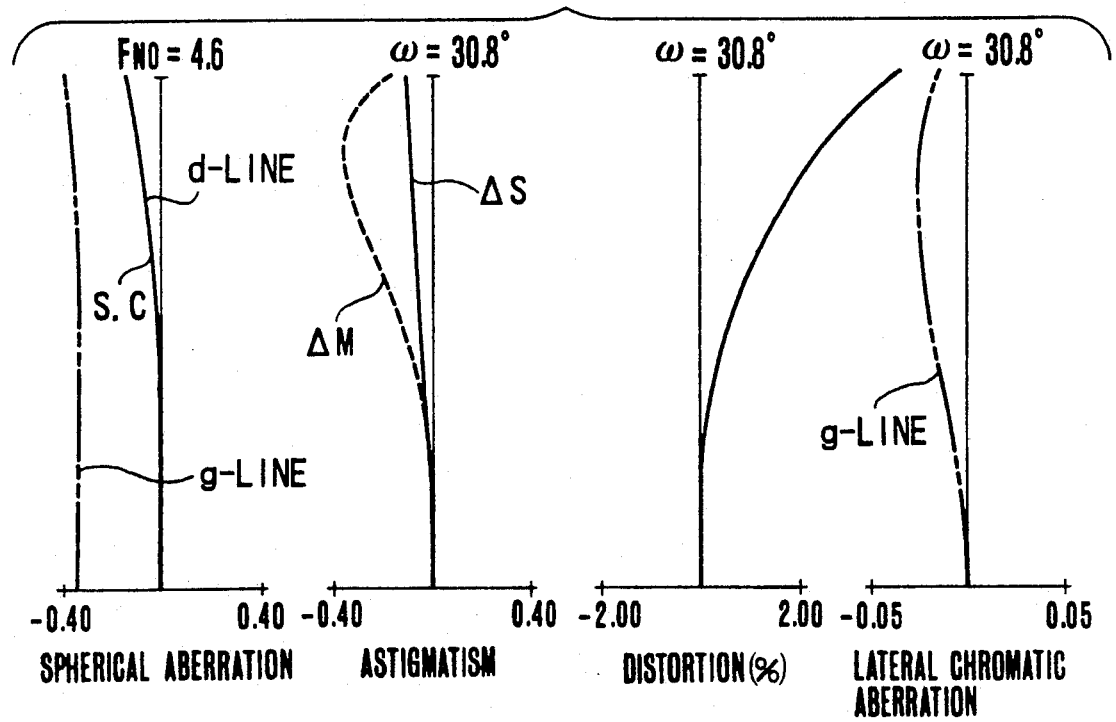
Figure 4B:
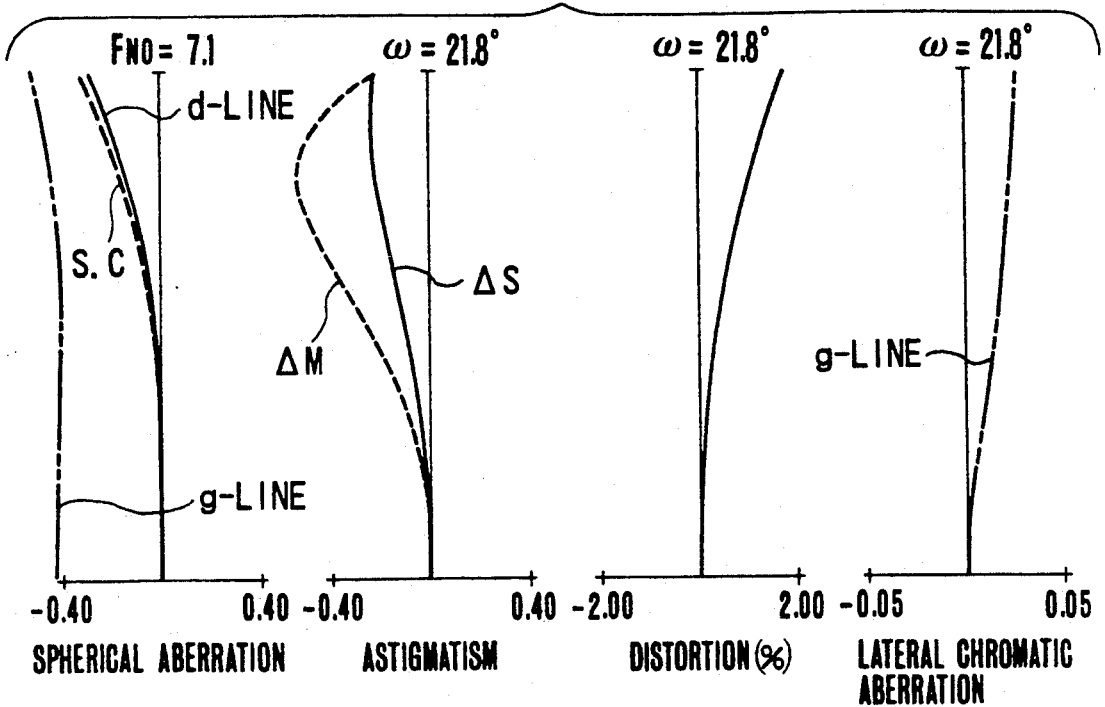
Figure 4C:
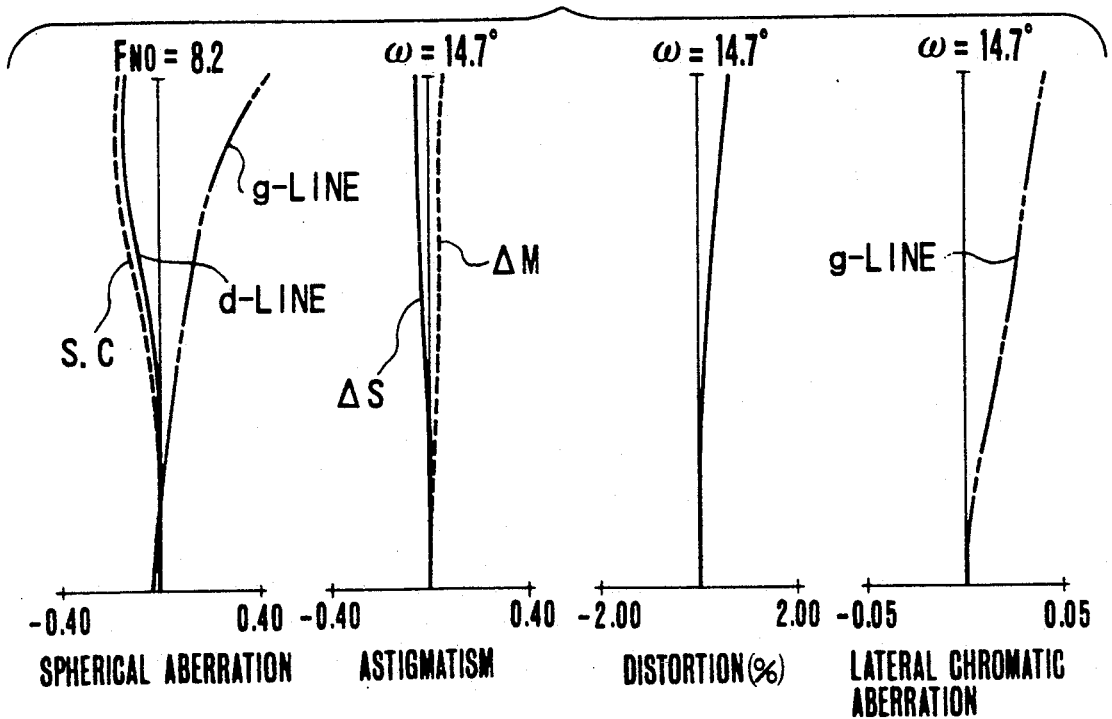

FIGS. 1(A), 1(B) and 1(C) and FIGS. 2(A), 2(B) and 2(C) are sectional views of the numerical examples 1 and 2 of zoom lenses of the invention, respectively. In the drawings, I denotes the first lens unit of negative refractive power, II the second lens unit of positive refractive power, and III the third lens unit of negative refractive power. The arrows indicate the moving directions of all the lens units when varying the magnification from the wide-angle end to the telephoto end.

The zoom lens according to the present embodiment, when varying the magnification from the wide-angle end to the telephoto end, has its three lens units made to move all toward the object side independently of each other as shown in each drawing. Particularly, the separation between the second lens unit and the third lens unit is made to vary largely so that a predetermined value of the zoom ratio is advantageously obtained. It should be noted that SP denotes a stop, which is arranged on the image side of the second lens unit and is made to move integrally with the second lens unit during variation of the magnification.

The zoom lens of the invention is, as shown in FIGS. 1(A), 1(B) and 1(C) and FIGS. 2(A), 2(B) and 2(C), constructed from three lens units of negative, positive and negative refractive powers in this order from the object side, in other words, made to have a lens form of almost symmetric type such that, on either side of the second lens unit of positive refractive power, there are arranged the first lens unit and the third lens unit both of negative refractive powers, so that the refractive power arrangement becomes negative, positive, negative during the variation of the magnification. Also, high refractive index, high dispersion glass (N1>1.8, $\mu$1<25) is employed in the first lens unit, and low refractive index, low dispersion glass (N2<1.52, 75<$\nu$2<85) is employed in the second lens unit.

By making the lens arrangement to be of such an almost symmetric type and using glass of appropriate properties, the method of correcting chromatic aberrations in each lens unit is not employed, which has prevailed in the prior art, but the chromatic aberrations are corrected in good balance as the whole lens system. In other words, the aberrations cancel each other in the three lens units. Also, while the shortening of the total length of the zoom lens is attained by constructing the first lens unit from a negative meniscus lens having a convex surface facing the object side, the second lens unit from a positive biconvex lens having a strong refractive surface facing the image side as compared with the object side, and the third lens unit from a positive meniscus lens having a convex surface facing the image side and a negative lens having a strong negative refractive surface facing the object side as compared with the image side, it is possible to obtain a zoom lens in which the various aberrations including chromatic aberrations can be corrected in good balance over the entire range of variation of the magnification for a high optical performance.

In addition, letting the focal length of the i-th lens unit be denoted by Fi, the focal length of the entire lens system in the wide-angle end by FW, the back focal distances in the wide-angle end and the telephoto end by SKW and SKT, respectively, an average value of the refractive indices of the materials of the negative lens of the first lens unit and the negative lens of the third lens unit by $\overline{nN}$, and the Abbe number of the material of the positive lens of the second lens unit by $\nu$2, the zoom lens is made to satisfy the following conditions:

$$1.1 < (SKT\text{-}SKW)/FW < 1.9 \quad (1)$$
$$-5 < F1/FW < -3 \quad (2)$$
$$-1 < F2/F3 < -0.8 \quad (3)$$
$$1.75 < \overline{nN} < 1.9 \quad (4)$$
$$75 < \nu2 < 85 \quad (5)$$

The technical significance of each of the above-described conditions is explained below.

The inequalities of condition (1) are to properly set the difference between the back focal distances in the wide-angle end and the telephoto end, in other words, the amount of movement of the third lens unit toward the object side with variation of the magnification from the wide-angle end to the telephoto end, and have an aim chiefly to shorten the total length of the zoom lens.

When the amount of movement of the third lens unit is too large as exceeding the upper limit of the condition (1), the third lens unit comes to mechanically interfere with the second lens unit in the neighborhood of the telephoto end. Also, when the amount of movement of the third lens unit is too small as exceeding the lower limit, the predetermined zoom ratio (about 2.4–3) becomes difficult to obtain. So, it is no good.

The inequalities of condition (2) are to properly set the negative refractive power of the first lens unit and have an aim to well correct various aberrations.

When the refractive power of the first lens unit is too strong as exceeding the upper limit of the condition (2), the balance of the refractive power arrangement of the entire lens system collapses, so that coma and other various aberrations become difficult to correct in good balance over the entire range of variation of the magnification. Also, when the refractive power of the first lens unit is too weak as exceeding the lower limit, it becomes difficult to well correct longitudinal chromatic aberration in the wide-angle side.

The inequalities of condition (3) are to properly set the ratio of the refractive powers of the second lens unit to the third lens unit and have an aim to obtain a predetermined zoom ratio advantageously.

When the refractive power of the third lens unit is too weak as exceeding the upper limit of the condition (3), the amount of movement of the third lens unit for securing the predetermined zoom ratio increases, so that the total length of the zoom lens becomes long. When the refractive power of the third lens unit is too strong as exceeding the lower limit, it becomes difficult to well correct off-axial aberrations such as curvature of field.

The inequalities of condition (4) are to properly set the average value $\overline{nN}$ of the refractive indices of the materials of the ones of the lenses constituting the zoom lens which are of negative refractive power (the negative lens of the first lens unit and the negative lens of the third lens unit) so that the Petzval sum gets an appropriate value, and have an aim to properly maintain the image surface characteristics. When the upper limit is exceeded, the Petzval sum increases in the positive direction. Also, when the lower limit is exceeded, the Petzval sum conversely increases in the negative direction. In either case, it becomes difficult to properly maintain the image surface characteristics and well correct astigmatism.

The inequalities of condition (5) are to properly set the Abbe number of the material of the positive lens of the second lens unit and have an aim chiefly to well correct longitudinal aberration over the entire range of variation of the magnification.

When the upper limit is exceeded, the longitudinal chromatic aberration is over-corrected in the telephoto side. Also, when the lower limit is exceeded, it becomes difficult to well correct the longitudinal chromatic aberration in a region of the zooming range from the wide-angle end to an intermediate position.

Further, in the present invention, particularly in order to properly maintain the optical performance of the entire area of the picture frame over the entire range of variation of the magnification, an aspheric surface is applied to the lens surface on the object side of the first lens unit, another aspheric surface to the lens surface on the image side of the second lens unit, and still another aspheric surface to the lens surface on the image plane side of the positive lens of the third lens unit, wherein letting the aspheric coefficient of fourth order of the aspheric surfaces of these lenses be denoted by B1, B2 and B31, respectively, and the diagonal length of the effective picture frame by Y, it is preferable to satisfy the following conditions:

$$-7 < B1 \cdot Y^3 < -2 \quad (6)$$
$$1 < B2 \cdot Y^3 < 3 \quad (7)$$
$$-3 < B31 \cdot Y^3 < -1 \quad (8)$$

The inequalities of conditions (6) and (8) have an aim chiefly to well correct curvature of field.

When the upper limit of the condition (6) or the upper limit of the condition (8) is exceeded, it becomes difficult to well correct the curvature of field. Also, when the lower limit of the condition (6) or the lower limit of the condition (8) is exceeded, the effect of the aspheric surface becomes too strong. Therefore, overcorrection of curvature of field results. So, it is no good.

When the upper limit of the condition (7) is exceeded, the effect of the aspheric surface becomes too weak so that it becomes difficult to well correct spherical aberration. Also, when the lower limit is exceeded, conversely over-correction of the spherical aberration results. So, it is no good.

Next, numerical examples 1 and 2 of the invention are shown. In the numerical examples 1 and 2, Ri is the radius of curvature of the i-th lens surface, when counted from the object side, Di is the i-th lens thickness or air separation from the object side, and Ni and $\nu i$ are respectively the refractive index and Abbe number of the glass of the i-th lens, when counted from the object side.

The shape of an aspheric surface is expressed in the coordinates with an X-axis in the axial direction and an H-axis in the direction perpendicular to the optical axis, the direction in which light advances being taken as positive, by the following equation:

$$X = (1/R)H^2/(1+(1-(H/R)^2)^{\frac{1}{2}}) + AH^2 + BH^4 + CH^6 + DH^8 + EH^{10}$$

where R is the radius of the osculating sphere, and A, B, C, D and E are the aspheric coefficients.

Also, the relationship of the above-described conditions (1) to (8) and the various numerical values in the numerical examples 1 and 2 is shown in Table-1.

Numerical Example 1 (FIGS. 1(A), 1(B), 1(C), 3(A), 3(B) and 3(C))

$F = 36.2 - 101.5$   $FNo = 4.1 - 8.8$   $2\omega = 61.7° - 24.1°$

| | | | |
|---|---|---|---|
| R 1 = 20.12 | D 1 = 1.5 | N 1 = 1.84666 | $\nu$ 1 = 23.9 |
| R 2 = 17.25 | D 2 = Variable | | |
| R 3 = 483.39 | D 3 = 3.0 | N 2 = 1.49700 | $\nu$ 2 = 81.6 |
| R 4 = −13.35 | D 4 = 1.0 | | |
| R 5 = Stop | D 5 = Variable | | |
| R 6 = −47.25 | D 6 = 3.0 | N 3 = 1.59551 | $\nu$ 3 = 39.2 |
| R 7 = −22.47 | D 7 = 4.11 | | |
| R 8 = −15.42 | D 8 = 1.7 | N 4 = 1.77250 | $\nu$ 4 = 49.6 |
| R 9 = 949.56 | | | |

| | Variable Separation | |
|---|---|---|
| Focal Length | D 2 | D 5 |
| 36.20 | 9.75 | 18.31 |
| 64.14 | 9.59 | 7.87 |
| 101.51 | 8.76 | 2.96 |

Aspheric Surfaces:

R 1: A = 0          B = −4.67 × 10$^{-5}$
     C = −2.25 × 10$^{-7}$   D = −3.93 × 10$^{-9}$
     E = 0
R 4: A = 0          B = 2.18 × 10$^{-5}$
     C = −9.52 × 10$^{-8}$   D = 0
     E = 0
R 7: A = 0          B = −2.73 × 10$^{-5}$
     C = 1.55 × 10$^{-7}$    D = −2.24 × 10$^{-9}$
     E = −7.24 × 10$^{-12}$

Numerical Example 2 (FIGS. 2(A), 2(B), 2(C), 4(A), 4(B) and 4(C))

$F = 36.2 - 82.3$   $FNo = 4.6 - 8.2$   $2\omega = 61.7° - 29.5°$

| | | | |
|---|---|---|---|
| R 1 = 17.84 | D 1 = 1.5 | N 1 = 1.84666 | $\nu$ 1 = 23.9 |
| R 2 = 14.51 | D 2 = Variable | | |
| R 3 = 163.28 | D 3 = 3.0 | N 2 = 1.49700 | $\nu$ 2 = 81.6 |
| R 4 = −13.00 | D 4 = 1.0 | | |
| R 5 = Stop | D 5 = Variable | | |
| R 6 = −33.29 | D 6 = 2.5 | N 3 = 1.59551 | $\nu$ 3 = 39.2 |
| R 7 = −21.34 | D 7 = 5.48 | | |
| R 8 = −15.74 | D 8 = 1.7 | N 4 = 1.77250 | $\nu$ 4 = 49.6 |
| R 9 = −551.10 | | | |

| | Variable Separation | |
|---|---|---|
| Focal Length | D 2 | D 5 |
| 36.20 | 9.84 | 15.42 |
| 55.71 | 9.65 | 7.62 |
| 82.30 | 9.08 | 3.01 |

Aspheric Surfaces:

R 1: A = 0          B = −5.18 × 10$^{-5}$
     C = −2.51 × 10$^{-7}$   D = −5.24 × 10$^{-9}$
     E = 0
R 4: A = 0          B = 2.2 × 10$^{-5}$
     C = −9.52 × 10$^{-8}$   D = 0
     E = 0
R 7: A = 0          B = −2.2 × 10$^{-5}$
     C = 2.96 × 10$^{-7}$    D = −4.74 × 10$^{-9}$
     E = 2.3 × 10$^{-11}$

TABLE-1

| | Numerical Example | |
|---|---|---|
| Condition | 1 | 2 |
| (1) (SKT-SKW)/FW | 1.72 | 1.24 |
| (2) F1/FW | −4.2 | −3.2 |
| (3) F2/F3 | −0.91 | −0.86 |
| (4) $\overline{nN}$ | 1.809 | 1.809 |
| (5) 2 | 81.6 | 81.6 |
| (6) B1 Y$^3$ | −3.78 | −4.2 |
| (7) B2 Y$^3$ | 1.76 | 1.78 |
| (8) B31 Y$^3$ | −2.21 | −1.64 |

Next, another embodiment in which harmful light in the zoom lens is cut to have a good optical performance is described.

Figure 5A:
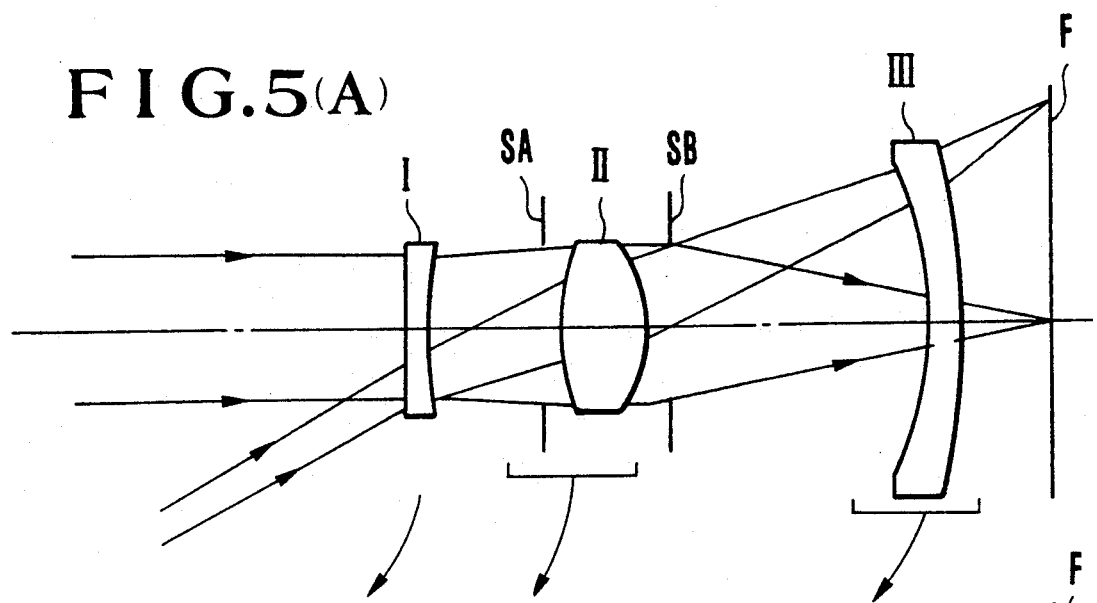
FIGS. 5(A), 5(B) and 5(C) are sectional views of a zoom lens of the invention with a flare cut stop arranged therein.
Figure 5B:
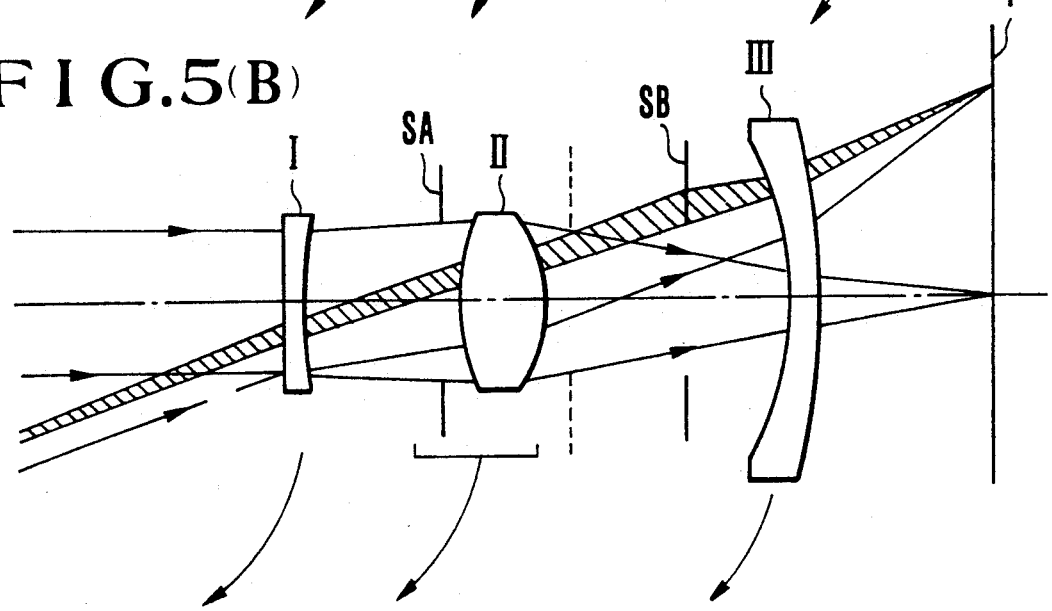
Figure 5C:
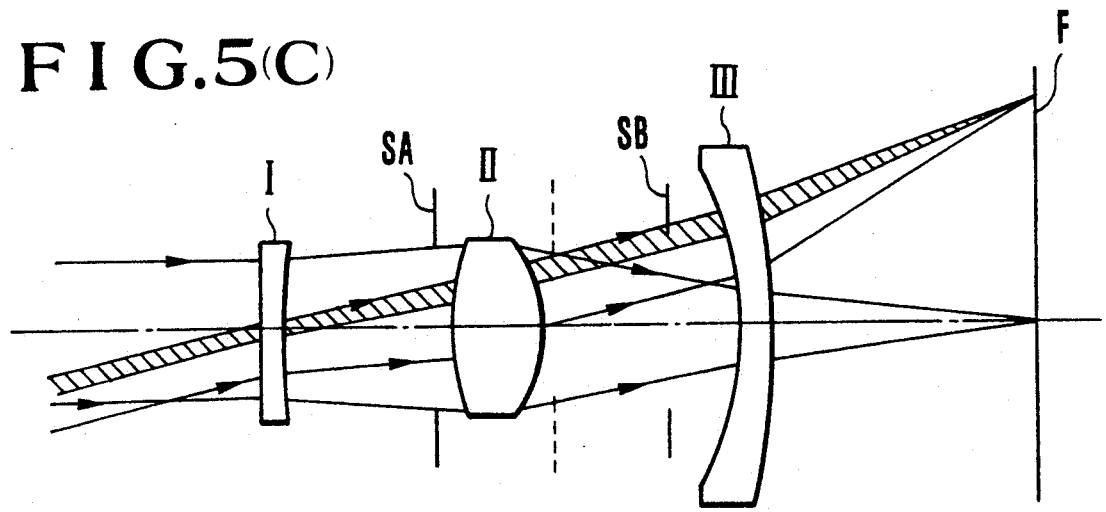
Figure 6A:
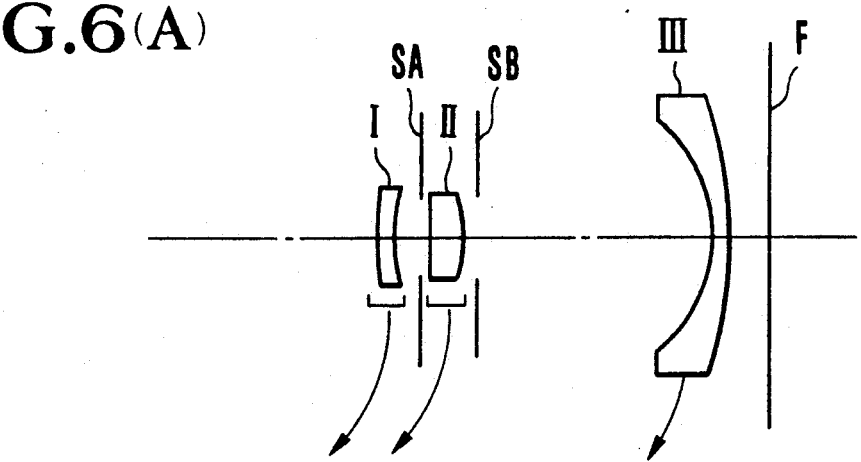
Figure 6B:
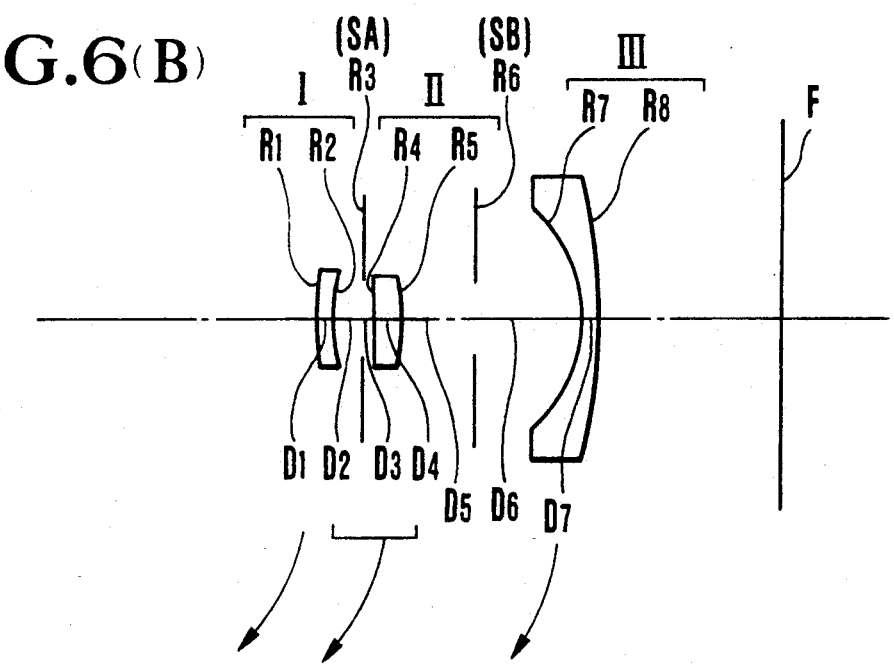
Figure 6C:
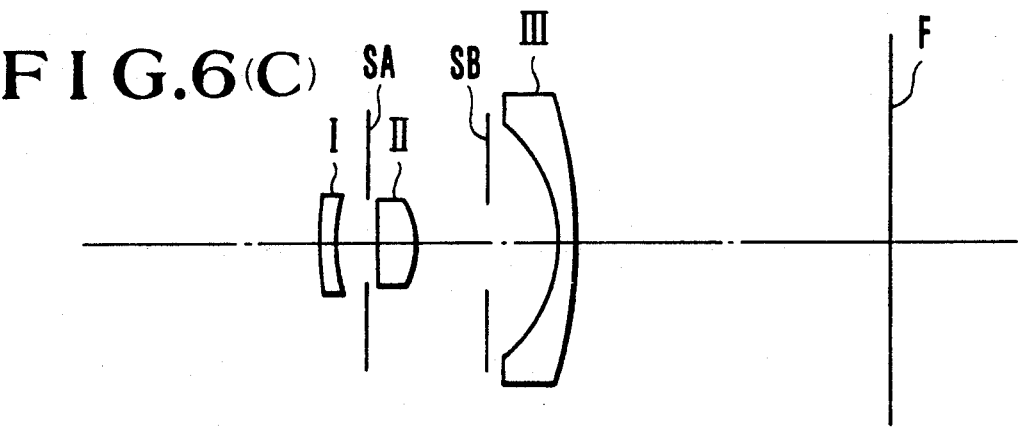
Figure 7A:
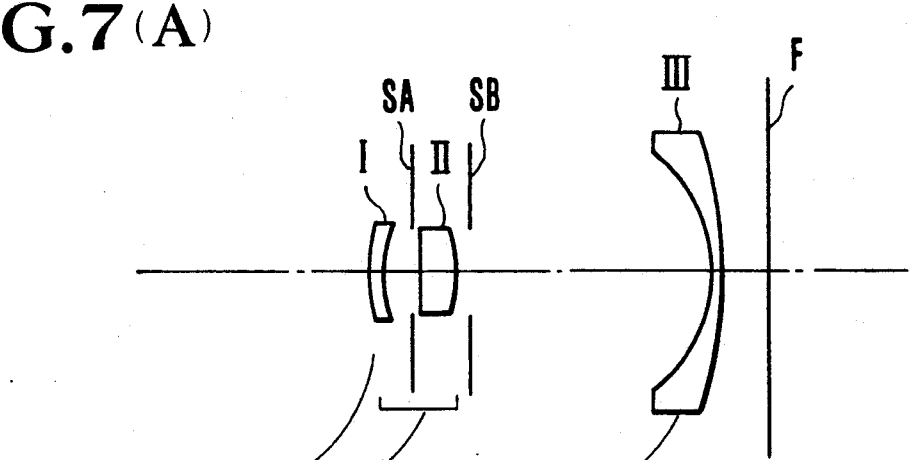
Figure 7B:
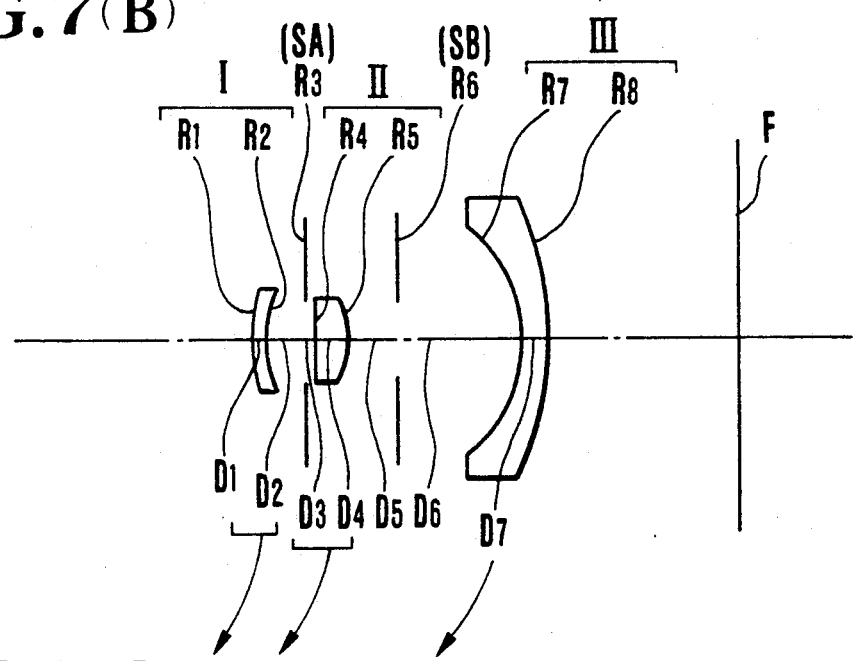
Figure 7C:
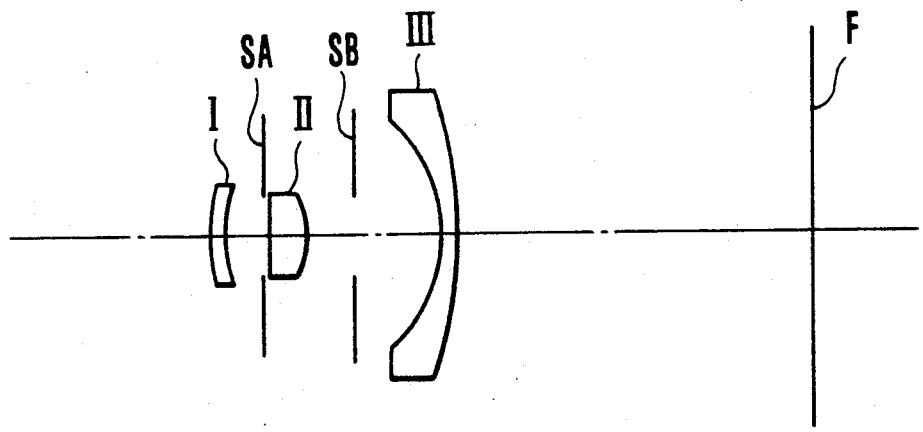
Figure 8A:
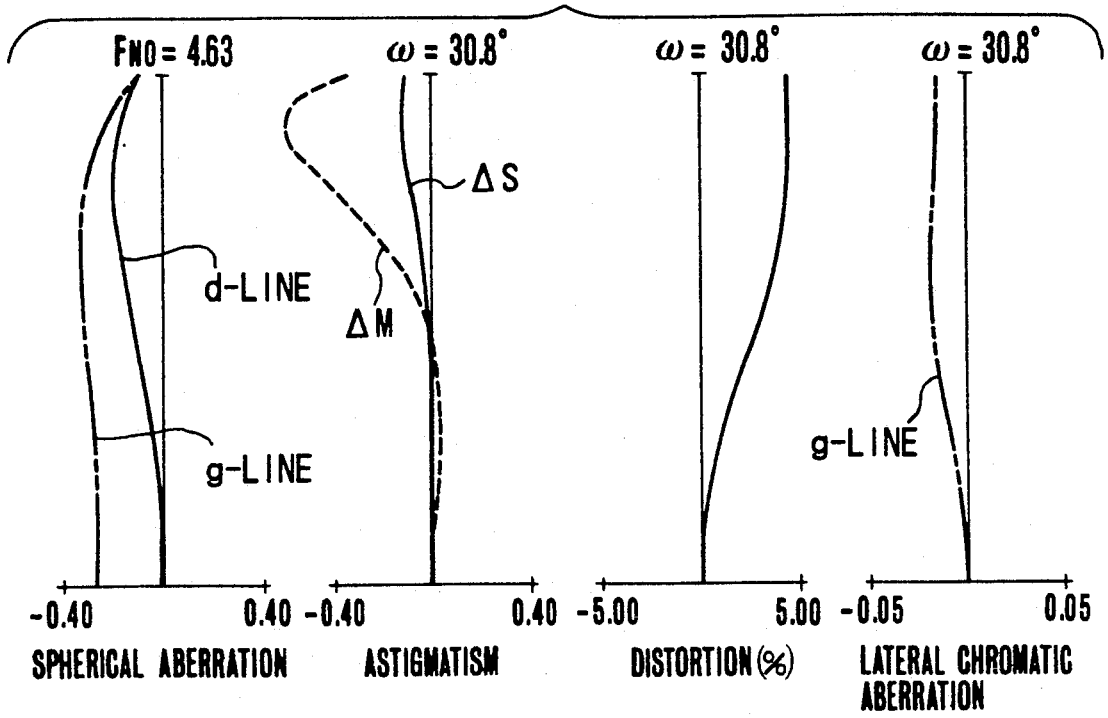
Figure 8B:
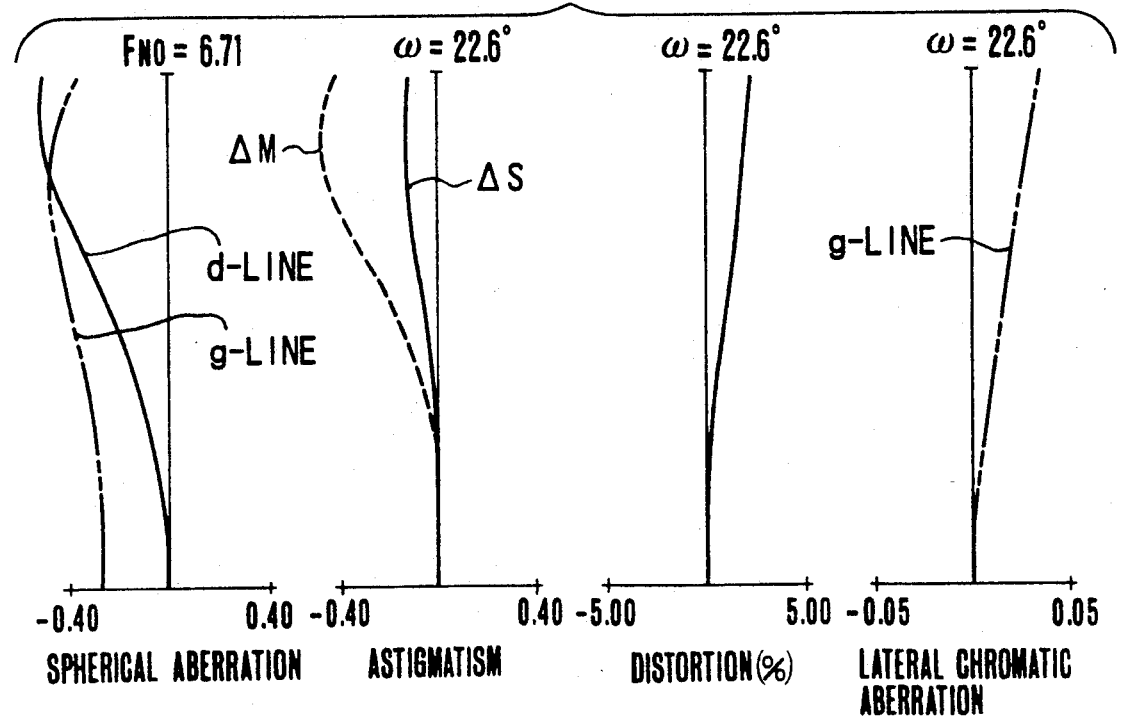
Figure 8C:
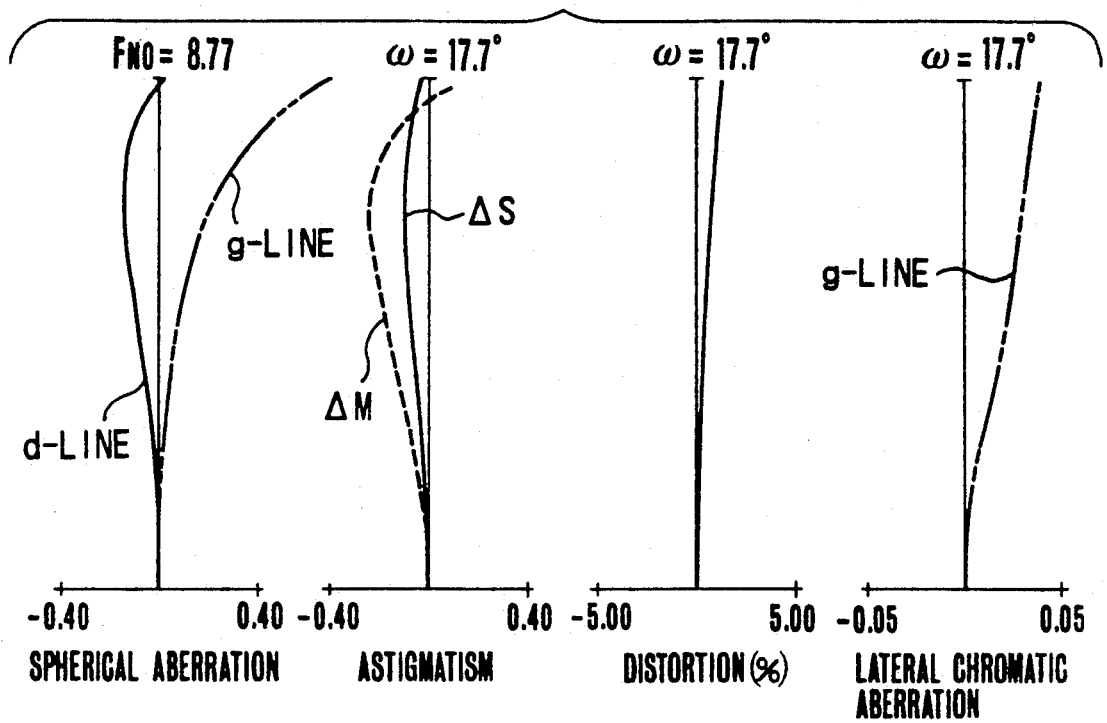
Figure 9A:
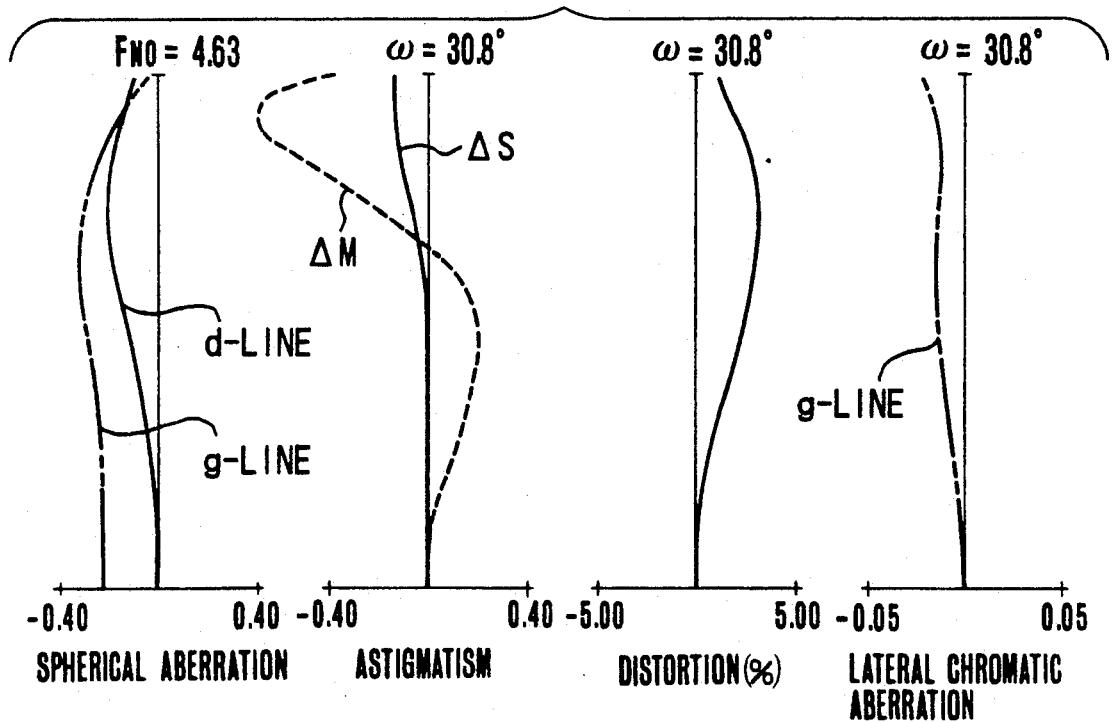
Figure 9B:
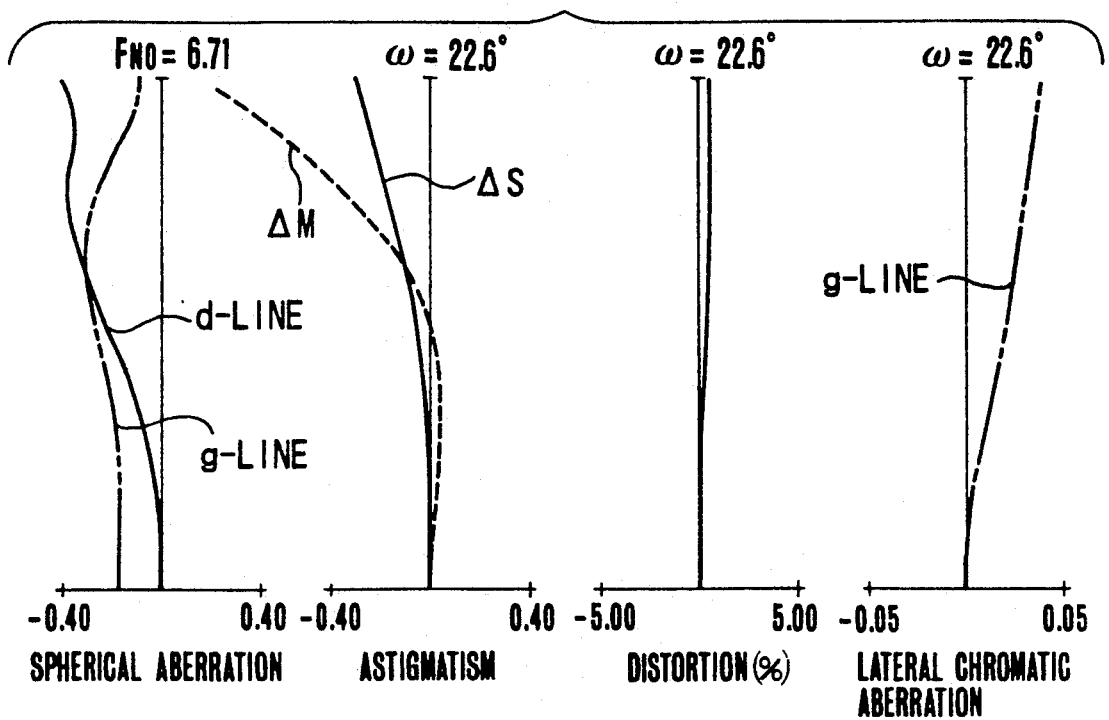
Figure 9C:
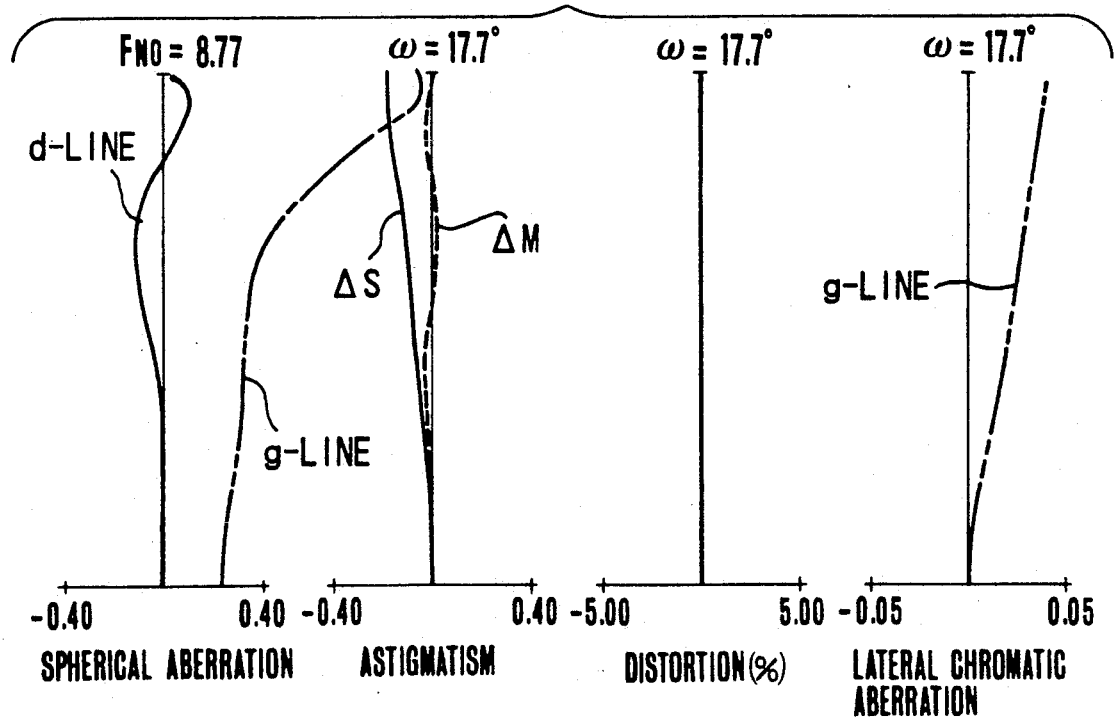
Figure 10A:
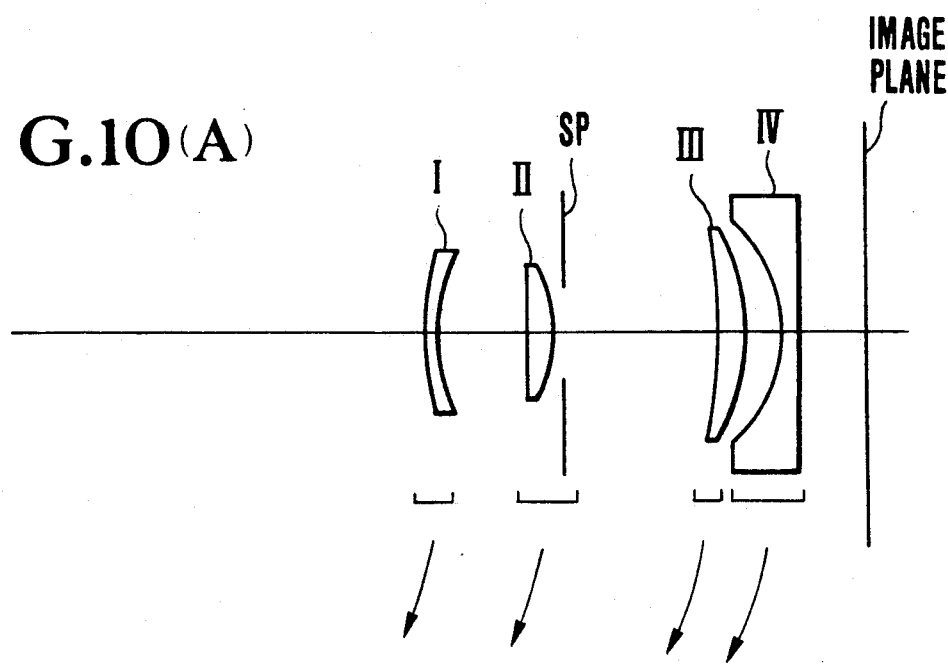
Figure 10B:
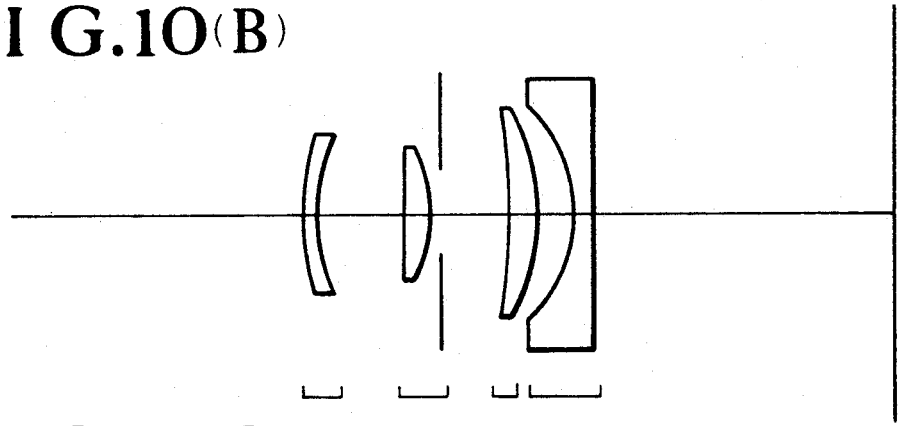
Figure 10C:
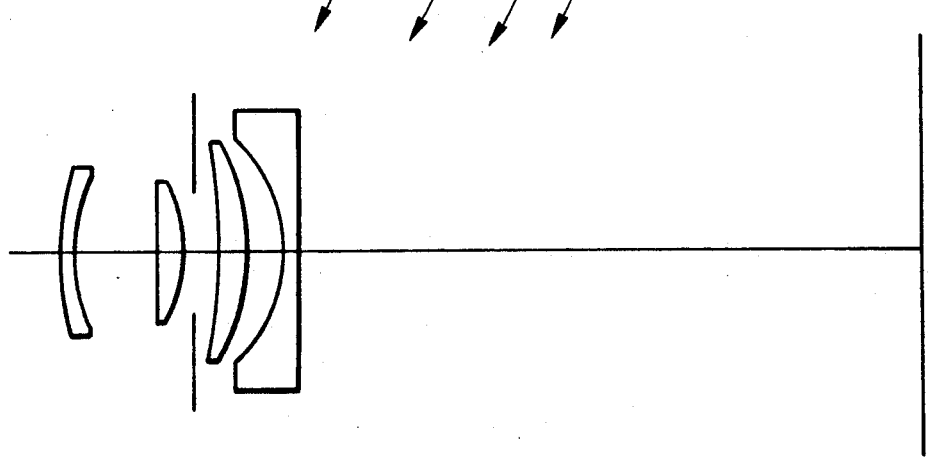
Figure 11A:
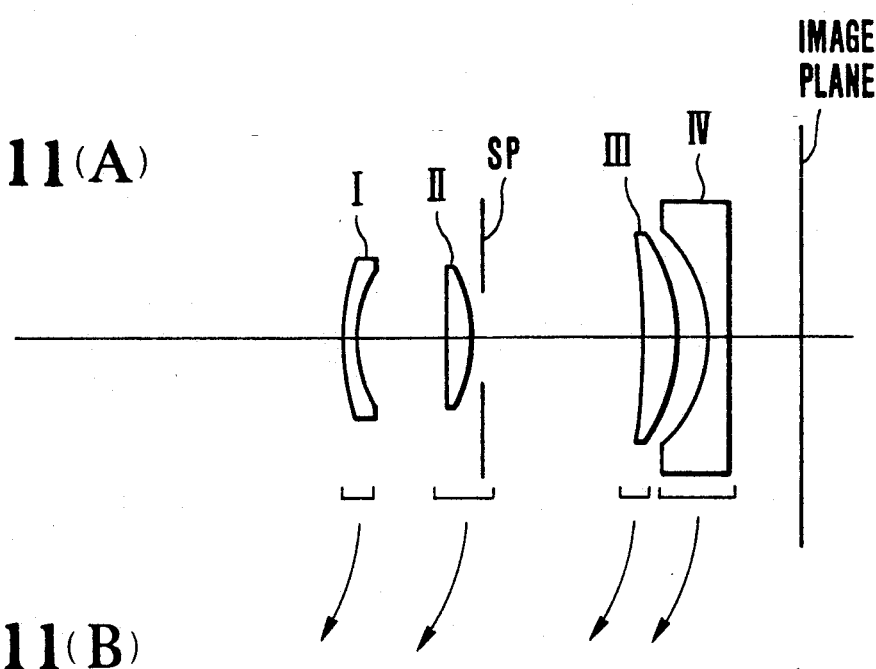
Figure 11B:
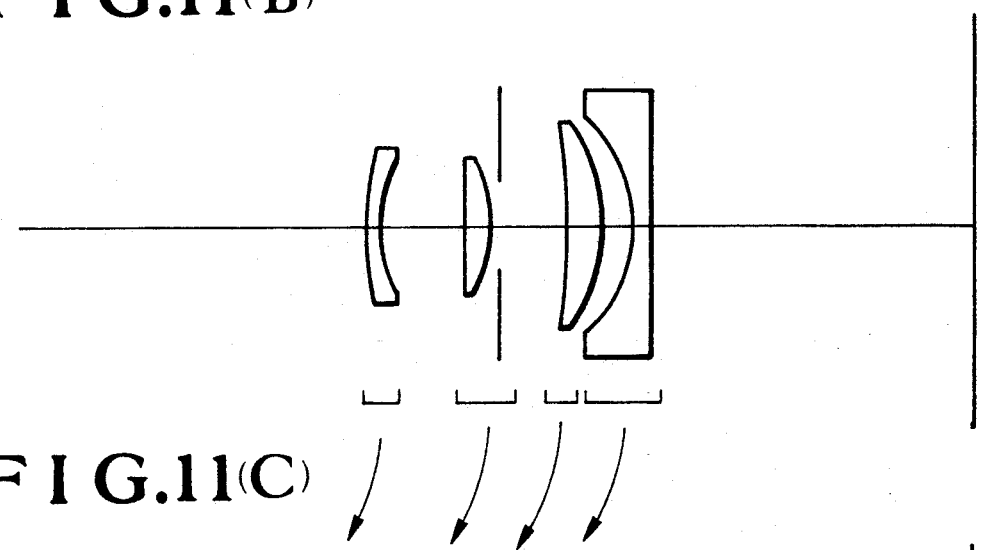
Figure 11C:
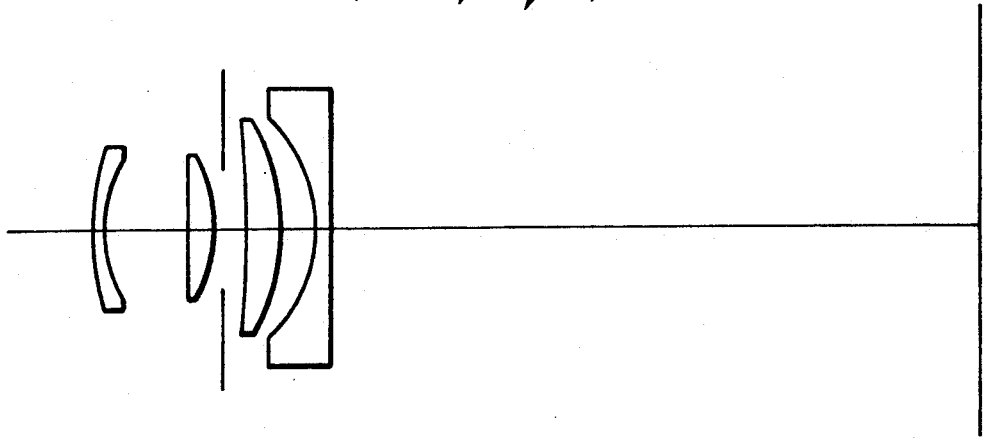
Figure 12A:
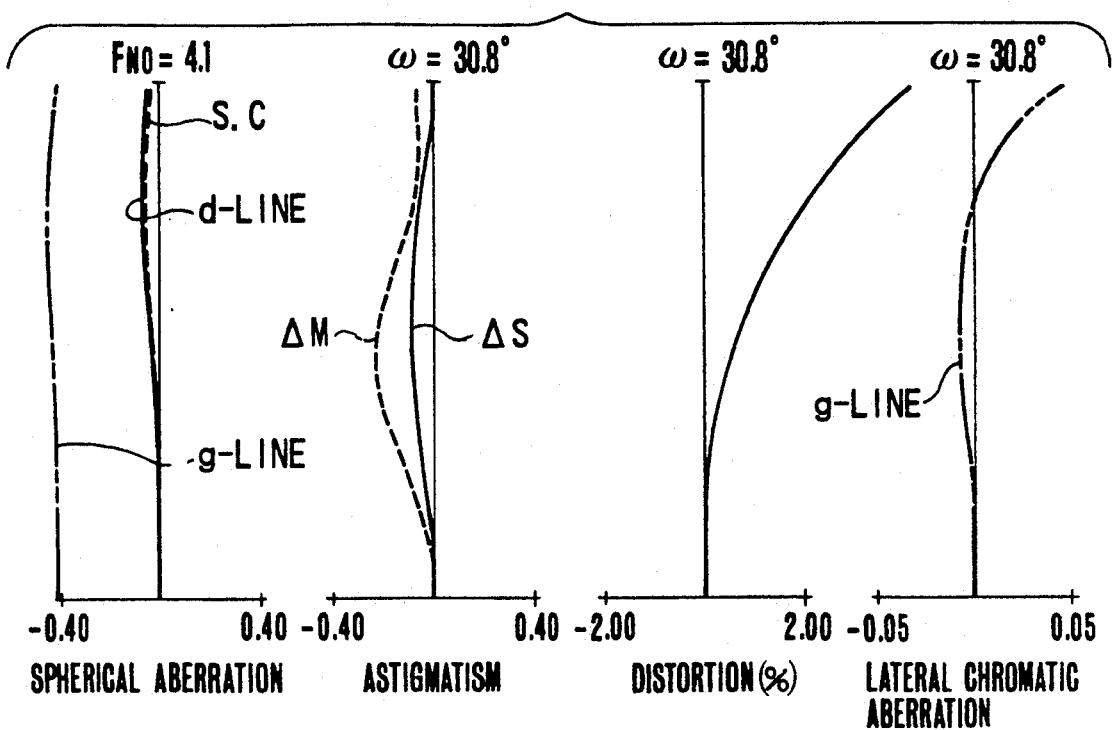
Figure 12B:
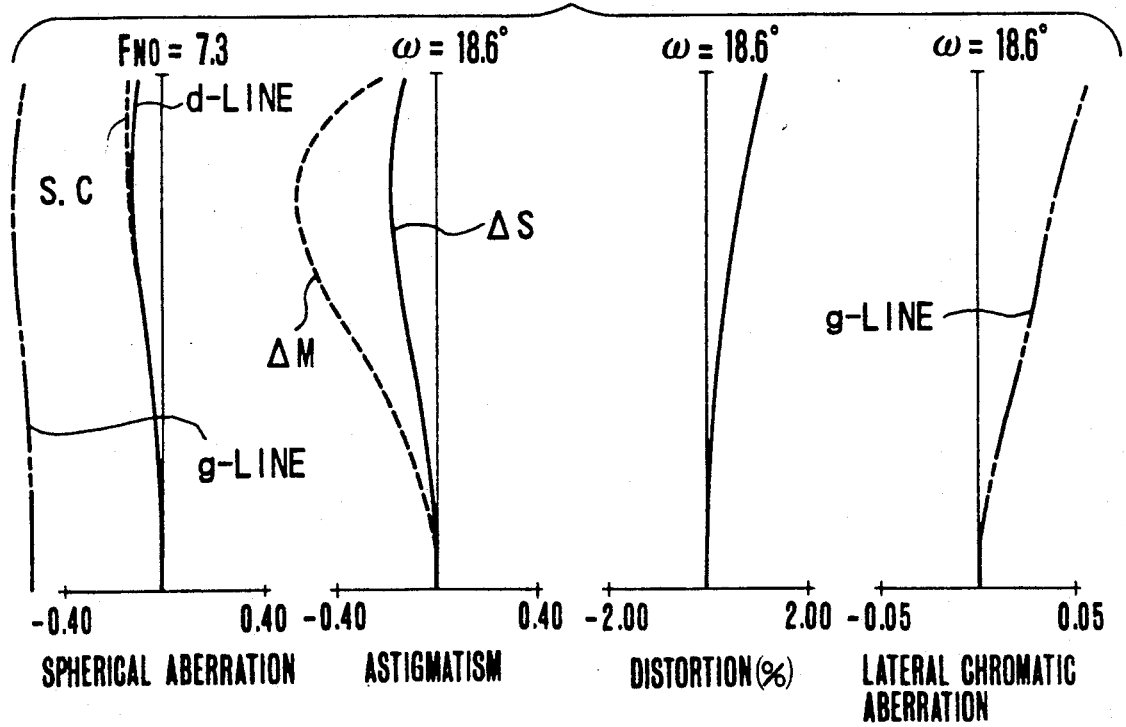
Figure 12C:
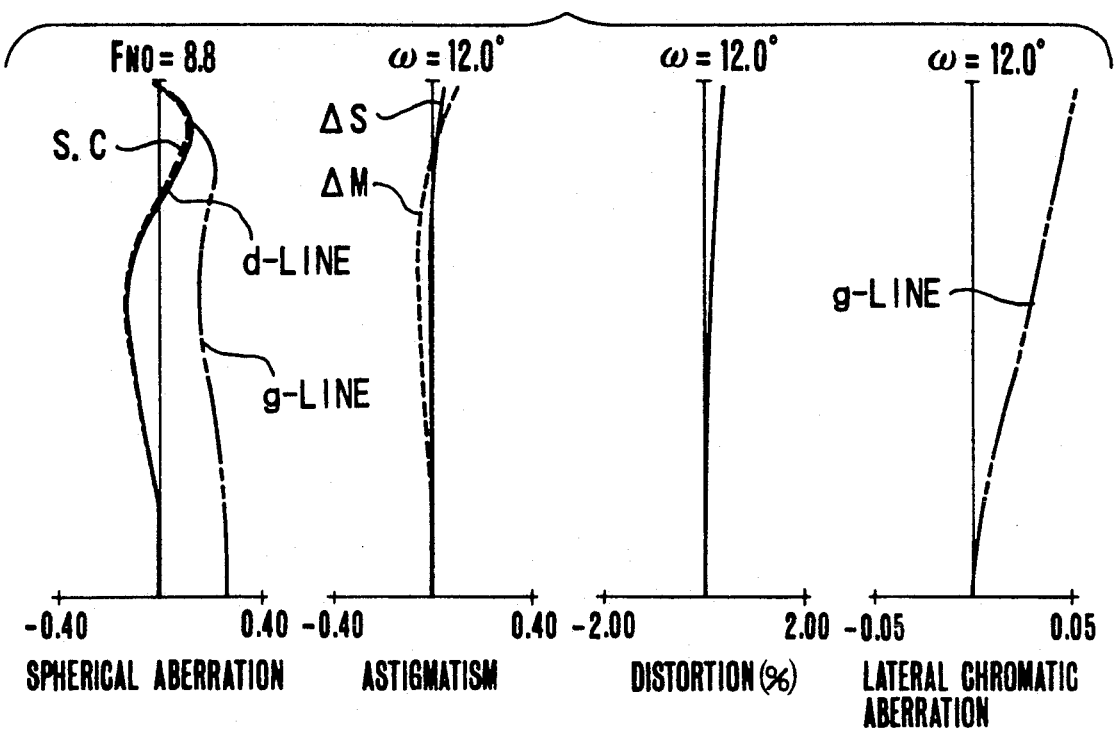
Figure 13A:
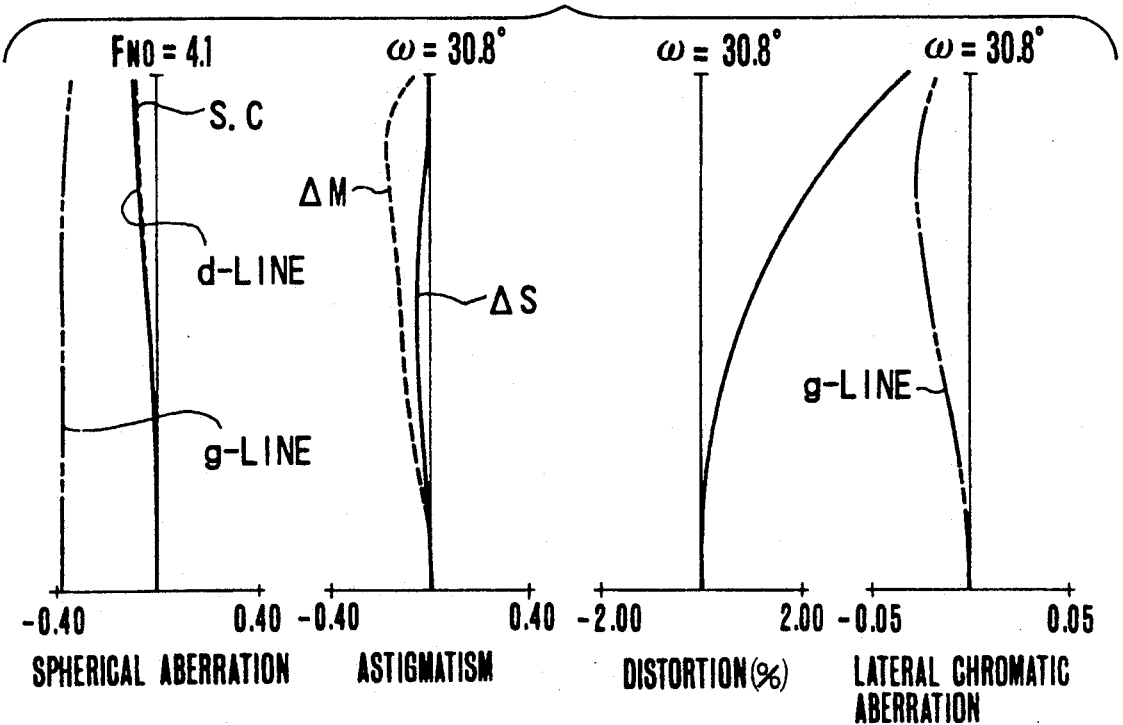
Figure 13B:
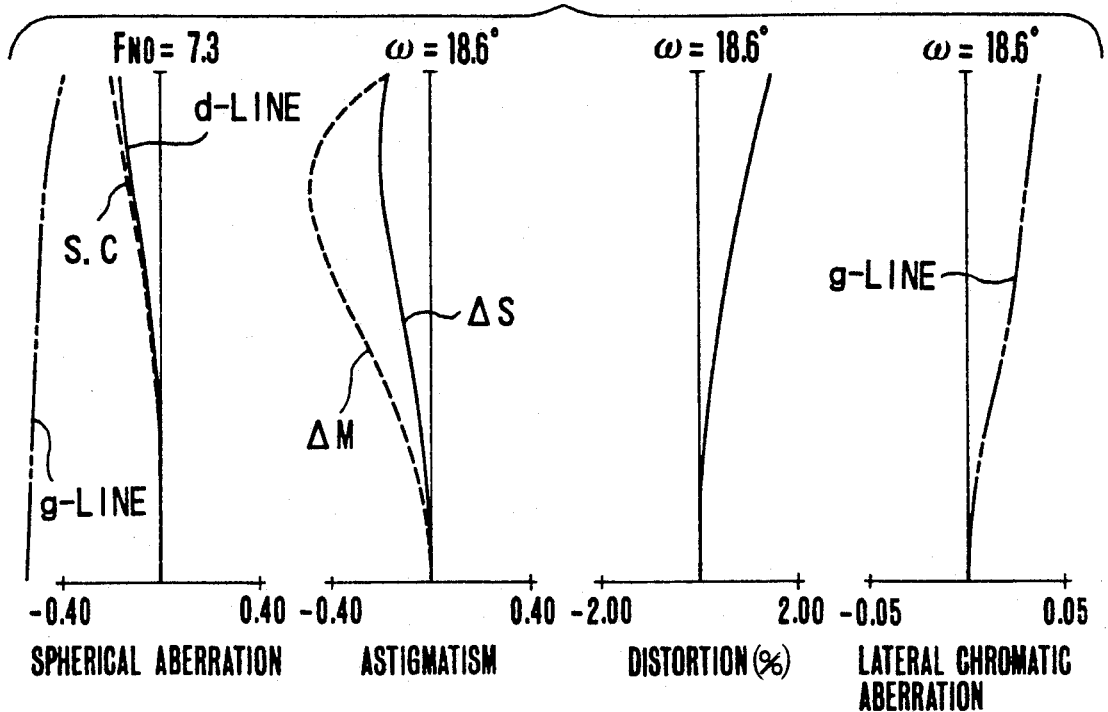
Figure 13C:
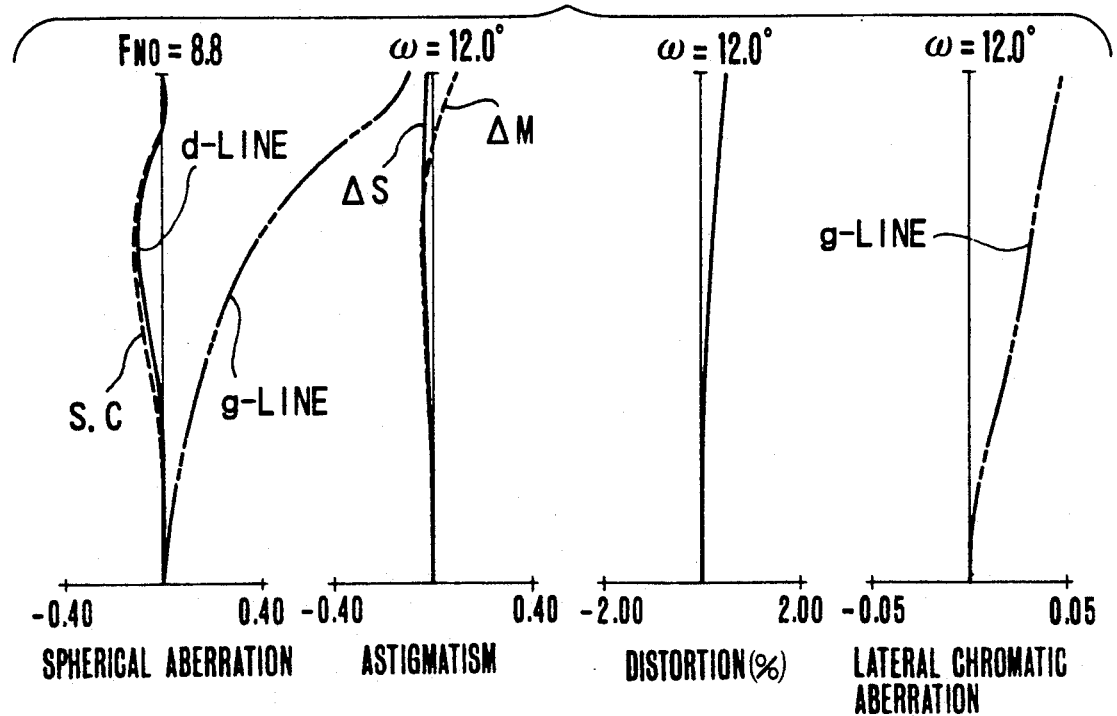

FIGS. 5(A), 5(B) and 5(C) are schematic diagrams of the main parts of the embodiment of the optical system according to the invention.

FIGS. 6(A), 6(B) and 6(C) and FIGS. 7(A), 7(B) and 7(C) are sectional views of numerical examples 3 and 4 of lenses of the invention, respectively.

In the drawings, I denotes the first lens unit of negative refractive power, II the second lens unit of positive refractive power, III the third lens unit of negative refractive power, and SA an aperture stop (F-number stop) disposed in between the first lens unit and the second lens unit. SB denotes a flare stop disposed in between the second lens unit and the third lens unit. F denotes an image plane.

In the present embodiment, variation of the magnification from the wide-angle end to the telephoto end is performed by moving the three lens units toward the object side independently as shown by the arrows. At this time, the aperture stop SA is moved integrally with the second lens unit. In addition, letting the separations between the flare stop and the second lens unit in the wide-angle end and the telephoto end be denoted by D5W and D5T, respectively, the zoom lens is made to satisfy the following condition:

$$0.03 < D5W/D5T < 0.9 \quad (9)$$

In the present embodiment, the flare stop SB is made to move independently so as to depict a locus of convex shape toward the image side. At this time, the flare stop SB and the second lens unit are made to move so appropriately that the separation between the flare stop SB and the second lens unit satisfies the condition (9), in other words, becomes wider in the telephoto end (FIG. 5(C)) than in the wide-angle end (FIG. 5(A)).

According to this arrangement, as illustrated by the hatching, an upper part of the off-axial light beam which would become a flare component is advantageously shut off in an intermediate zooming position (FIG. 5(B)) to the zooming position in the telephoto end (FIG. 5(C)), so that the optical performance is properly maintained.

Particularly, in the neighborhood of the intermediate zooming position, an upper part of the off-axial light beam is advantageously shut off by disposing the aperture stop SA nearer to the object side than the second lens unit, and the flare stop SB nearer to the image side than the second lens unit and by satisfying the condition (9).

When the amount of variation of the separation between the flare stop SB and the second lens unit with variation of the magnification is too small as exceeding the upper limit of the condition (9), it is no good because the shut mount of the flare light beam of the upper part of the off-axial light beam in the intermediate zooming position comes to decrease.

Conversely when the separation between the second lens unit and the flare stop on the telephoto side is too wide as exceeding the lower limit of the condition (9), it is no good because the flare stop and the third lens unit come to mechanically interfere with each other.

The zoom lens according to the present embodiment has its three lens units made to move all toward the object side independently when varying the magnification from the wide-angle end to the telephoto end as shown in each drawing. Particularly, by varying the separation between the second lens unit and the third lens unit largely, a predetermined zoom ratio is obtained advantageously.

The zoom lens of the invention is constructed, as shown in FIGS. 5(A), 5(B) and 5(C), FIGS. 6(A), 6(B) and 6(C) and FIGS. 7(A), 7(B) and 7(C), from the lens units of negative, positive and negative refractive powers in this order from the object side. In other words, on either side of the second lens unit, there are arranged the first lens unit and the third lens unit of negative refractive power so that during the variation of the magnification, the refractive power arrangement becomes to be of almost symmetric type. Also, high refractive index, high dispersion glass is employed in the first lens unit, and low refractive index, low dispersion glass is employed in the second lens unit.

By making the lens arrangement to be of such almost symmetric type and using glass of suitable properties, the method of correcting chromatic aberrations in each lens unit which has prevailed in the prior art is not taken, but, as the whole lens system, the chromatic aberrations are corrected in good balance. In other words, the aberrations of the three lens units are made to cancel each other.

Also, while the shortening of the total length of the zoom lens is attained by constructing each lens unit from a single lens, i.e., the first lens unit from a negative meniscus lens having a convex surface facing the object side, the second lens unit from a positive biconvex lens having a strong refractive surface facing the image side, and the third lens unit from a negative meniscus lens having a convex surface facing the image side, the various aberrations including chromatic aberrations can be corrected in good balance over the entire range of variation of the magnification. It is, therefore, possible to obtain a zoom lens of high optical performance.

It should be noted that, in the invention, in order to further improve the correction of the various aberrations in good balance over the entire range of variation of the magnification, it is preferable that, letting the focal length of the i-th lens unit be denoted by Fi, the focal length of the entire lens system in the wide-angle end by FW, the intervals between the principal points of the i-th lens unit and the (i+1)st lens unit in the wide-angle end and the telephoto end by EiW and EiT, respectively, the following conditions are satisfied:

$$-2.8 < F1/FW < -1.3 \quad (10)$$
$$0.09 < E1W/FW < 0.25 \quad (11)$$
$$-1 < F2/F3 < -0.6 \quad (12)$$
$$-0.3 < (E1W\text{-}E1T)/(E2W\text{-}E2T) < 0.2 \quad (13)$$

The inequalities of condition (10) are to properly set the negative refractive power of the first lens unit to well correct various aberrations.

When the refractive power of the first lens unit is too strong as exceeding the upper limit of the condition (10), it becomes difficult to correct the various aberrations in good balance over the entire range of variation of the magnification. Also, when the refractive power of the first lens unit is too weak as exceeding the lower limit, it becomes difficult to well correct longitudinal chromatic aberration in the wide-angle side.

The inequalities of condition (11) are to properly set the interval between the principal points of the first lens unit and the second lens unit in the wide-angle end to correct various aberrations in good balance while still permitting the size of the whole lens system to be minimized.

When the principal point interval between the first lens unit and the second lens unit is too long as exceeding the upper limit of the condition (11), the effective lens diameter of the first lens unit increases. Also, when the principal point interval between the first lens unit and the second lens unit is too short as exceeding the lower limit, the symmetry of the whole lens system comes to collapse, so that it becomes difficult to correct the various aberrations in good balance.

The inequalities of condition (12) are to properly set the ratio of the refractive powers of the second lens unit to the third lens unit to advantageously obtain a predetermined zoom ratio.

When the refractive power of the third lens unit is too weak as exceeding the upper limit of the condition (12), the amount of movement of the third lens unit for securing the predetermined zoom ratio increases, so that the total length of the zoom lens becomes long. Also, when the refractive power of the third lens unit is too strong as exceeding the lower limit, it becomes difficult to well correct off-axial aberrations such as field curvature.

The inequalities of condition (13) are to properly set the ratio of the amount of variation of the principal point interval between the first lens unit and the second lens unit to the amount of variation of the principal point interval between the second lens unit and the third lens unit when varying the magnification from the wide-angle end to the telephoto end to well correct chiefly curvature of field.

When the upper limit of the condition (13) is exceeded, the curvature of field comes to increase largely in the negative direction when varying the magnification from the wide-angle end to the telephoto end. Also, when the lower limit is exceeded, the curvature of field comes conversely to vary largely in the positive direction when varying the magnification from the wide-angle end to the telephoto end.

Further, in the present invention, in order to well correct the various aberrations while minimizing the size of the whole lens system, it is preferable that the above-described three lens units each are constructed from a single lens and that letting the refractive index and Abbe number of the material of the lens of the i-th lens unit by Ni and $\nu i$, respectively, the following conditions are satisfied:

$$0.16 < (N1+N3)/2 - N2 < 0.45 \quad (14)$$

$$\nu1 < \mu3 < \nu2 \quad (15)$$

The inequalities of condition (14) are to properly set the refractive index of the material of each lens unit to well correct chiefly curvature of field. When the upper limit is exceeded, the Petzval sum increases in the positive direction. Also, when the lower limit is exceeded, conversely the Petzval sum increases in the negative direction. In either case, it becomes difficult to well correct astigmatism.

The inequalities of condition (15) are to properly set the Abbe number of the material of each lens unit to well correct longitudinal chromatic aberration and lateral chromatic aberration over the entire range of variation of the magnification.

When the condition (15) is violated, it becomes difficult to correct these chromatic aberrations in good balance over the entire range of variation of the magnification.

Furthermore, in the invention, in order to properly maintain the optical performance of the entire area of the picture frame over the entire range of variation of the magnification, it is preferable to apply an aspheric surface to the lens surface on the object side of the first lens unit, another aspheric surface to the lens surface on the image side of the second lens unit and still another aspheric surface to the lens surface on the object side of the third lens unit and to satisfy the following conditions:

$$-15 < b1 \cdot Y^3 < -1 \quad (16)$$

$$-7 < B2 \cdot Y^3 < -0.1 \quad (17)$$

$$|B3 \cdot Y^3| < 2 \quad (18)$$

where Bi is the aspheric coefficient of fourth order of the aspheric surface of the i-th lens unit, and Y is the diagonal length of the effective picture frame.

The inequalities of conditions (16) and (18) have an aim chiefly to well correct the curvature of field.

When the upper limit of the condition (16) or the lower limit of the condition (18) is exceeded, it becomes difficult to well correct the curvature of field. Also, when the lower limit of the condition (16) or the upper limit of the condition (18) is exceeded, it is no good because the aspheric surface effect becomes too strong so that the curvature of field comes to be overcorrected.

When the upper limit of the condition (17) is exceeded, the aspheric surface effect becomes too weak so that it becomes difficult to well correct spherical aberration. Also, when the lower limit is exceeded, it is no good because conversely the spherical aberration comes to be over-corrected.

Next, numerical examples 3 and 4 of the invention are shown. Also, the relation of the above-described conditions (9) to (14) and (16) to (18) with the various numerical values in the numerical examples 3 and 4 is shown in Table-2.

Numerical Example 3 (FIGS. 6(A), 6(B), 6(C), 8(A), 8(B) and 8(C))

$F = 36.2 - 67.7 \quad FNo = 4.63 - 8.77 \quad 2\omega = 61.6° - 35.4°$

| | | | |
|---|---|---|---|
| R 1 = 29.70 | D 1 = 1.8 | N 1 = 1.80518 | $\nu$ 1 = 25.4 |
| R 2 = 18.01 | D 2 = Variable | | |
| R 3 = Aperture | D 3 = 1.0 | | |
| Stop | | | |
| R 4 = 276.31 | D 4 = 4.0 | N 2 = 1.49831 | $\nu$ 2 = 65.0 |
| R 5 = −11.26 | D 5 = Variable | | |
| R 6 = Flare | D 6 = Variable | | |
| Stop | | | |
| R 7 = −14.50 | D 7 = 1.7 | N 3 = 1.69680 | $\nu$ 3 = 55.5 |
| R 8 = −54.09 | | | |

| Focal | Variable Separation | | |
|---|---|---|---|
| Length | D 2 | D 5 | D 6 |
| 36.20 | 3.16 | 1.00 | 26.96 |
| 51.92 | 3.58 | 7.57 | 12.84 |
| 67.70 | 3.73 | 8.18 | 8.28 |

Aspheric Coefficients:

| | | |
|---|---|---|
| R 1: A = 0 | | B = −1.19 × 10$^{-4}$ |
| C = −9.71 × 10$^{-7}$ | | D = −1.28 × 10$^{-8}$ |
| E = 0 | | |
| R 5: A = 0 | | B = −3.74 × 10$^{-5}$ |
| C = −2.4 × 10$^{-7}$ | | D = 2.72 × 10$^{-9}$ |
| E = −7.32 × 10$^{-11}$ | | |
| R 7: A = 0 | | B = −3.65 × 10$^{-6}$ |
| C = 8.59 × 10$^{-8}$ | | D = 4.22 × 10$^{-10}$ |
| E = 3.09 × 10$^{-12}$ | | |

Numerical Example 4 (FIGS. 7(A), 7(B), 7(C), 9(A), 9(B) and 9(C))

$F = 36.2 - 67.7 \quad FNo = 4.63 - 8.77 \quad 2\omega = 61.6° - 35.4°$

| | | | |
|---|---|---|---|
| R 1 = 21.95 | D 1 = 1.8 | N 1 = 1.78472 | $\nu$ 1 = 25.7 |
| R 2 = 14.89 | D 2 = Variable | | |
| R 3 = Aperture | D 3 = 1.0 | | |
| Stop | | | |
| R 4 = 858.91 | D 4 = 4.0 | N 2 = 1.48749 | $\nu$ 2 = 70.2 |
| R 5 = −10.96 | D 5 = Variable | | |
| R 6 = Flare | D 6 = Variable | | |
| Stop | | | |
| R 7 = −14.44 | D 7 = 1.7 | N 3 = 1.71299 | $\nu$ 3 = 53.8 |

-continued

| F = 36.2 − 67.7 | FNo = 4.63 − 8.77 | 2ω = 61.6° − 35.4° |
|---|---|---|
| R 8 = −41.43 | | |

| Focal | Variable Separation | | |
|---|---|---|---|
| Length | D 2 | D 5 | D 6 |
| 36.18 | 3.26 | 1.00 | 26.77 |
| 52.04 | 3.68 | 5.01 | 14.35 |
| 67.70 | 3.94 | 4.88 | 10.08 |

Aspheric Coefficients:

R 1: $A = 0$        $B = -1.21 \times 10^{-4}$
     $C = -6.97 \times 10^{-7}$    $D = -2.46 \times 10^{-8}$
     $E = 0$
R 5: $A = 0$        $B = -4.40 \times 10^{-5}$
     $C = -4.84 \times 10^{-7}$    $D = 3.85 \times 10^{-8}$
     $E = -1.21 \times 10^{-9}$
R 7: $A = 0$        $B = 1.50 \times 10^{-6}$
     $C = 4.47 \times 10^{-8}$    $D = 6.82 \times 10^{-10}$
     $E = 3.67 \times 10^{-12}$

TABLE-2

| | Numerical Example | |
|---|---|---|
| Condition | 3 | 4 |
| (9) D5W/D5T | 0.12 | 0.2 |
| (10) F1/FW | −1.68 | −1.83 |
| (11) E1W/FW | 0.14 | 0.12 |
| (12) F2/F3 | −0.75 | −0.70 |
| (13) $\frac{E1W - E1T}{E2W - E2T}$ | −0.05 | −0.053 |
| (14) $\frac{N1 + N3}{2} - N2$ | 0.253 | 0.261 |
| (16) $B1\ Y^3$ | −9.58 | −9.84 |
| (17) $B2\ Y^3$ | −3.02 | −3.55 |
| (18) $B3\ Y^3$ | −0.29 | 0.12 |

Next, another embodiment in which, while the lens structure is simple, the zoom ratio is extended to about 3 by adding some improvements to the zoom lens described above, is described below.

FIGS. 10(A), 10(B) and 10(C) and FIGS. 11(A), 11(B) and 11(C) are sectional views of numerical examples 5 and 6 of lenses of the invention, respectively. In the drawings, I denotes the first lens unit of negative refractive power, II the second lens unit of positive refractive power, III the third lens unit of positive refractive power and IV the fourth lens unit of negative refractive power. Each of these lens units is constructed from a single lens. The arrows indicate the moving directions of the lens units.

The zoom lens according to the present embodiment has its four lens units made to move toward the object side independently, while varying the air separations between the lens units, when varying the magnification from the wide-angle end to the telephoto end, as shown in the drawings. Particularly, the separation between the second lens unit and the third lens unit is made to vary largely to advantageously obtain a predetermined zoom ratio. It is to be noted that SP is a stop arranged on the image side of the second lens unit to move integrally with the second lens unit when varying the magnification.

The zoom lens of the present invention is constructed, as shown in FIGS. 10(A), 10(B) and 10(C) and FIGS. 11(A), 11(B) and 11(C), from the four lens units of negative, positive, positive and negative refractive powers in this order from the object side. In other words, on either side of the second lens unit and the third lens unit of positive refractive powers, there are arranged the first lens unit and the fourth lens unit of negative refractive powers. Also, the stop SP is arranged in between the second lens unit and the third lens unit, so that, during variation of the magnification, the lens construction becomes such that the refractive power arrangement is of almost symmetric type. Also, high refractive index, high dispersion glass (N1 > 1.65, ν1 < 35) is employed in the first lens unit, and low refractive index, low dispersion glass (N2 < 1.52, ν2 > 75) is employed in the second lens unit.

By making such a lens arrangement of almost symmetric type and constructing each lens unit from a single lens of suitable form, the method of correcting chromatic aberrations in each lens unit is not taken as in the prior art, but the chromatic aberrations are corrected in good balance over the whole lens system. In other words, the aberrations of the four lens units are made to cancel each other.

Also, while a shortening of the total length of the zoom lens is attained by constructing the first lens unit from a negative meniscus lens having a convex surface facing the object side, the second lens unit from a positive bi-convex lens having a strong refractive surface facing the image side as compared with the object side, the third lens unit from a positive meniscus lens having a convex surface facing the image side, and the fourth lens unit from a negative lens having a strong refractive surface facing the object side as compared with the image side, various aberrations including chromatic aberrations can be corrected in good balance over the entire range of variation of the magnification. It is, therefore, possible to obtain a zoom lens of high optical performance.

In the present embodiment, letting the focal length of the i-th lens unit by Fi, the focal length of the entire lens system in the wide-angle end by FW, the air separations between the i-th lens unit and the (i+1)st lens unit in the wide-angle end and the telephoto end by DiW and DiT, respectively, the following conditions are satisfied:

$-4 < F1/FW < -2.3$ (19)
$0.5 < F2/FW < 0.8$ (20)
$1.6 < F3/FW < 2$ (21)
$-0.6 < F4/FW < -0.4$ (22)
$0.8 < D1T/D1W < 1.1$ (23)
$0.1 < D2T/D2W < 0.4$ (24)
$1 < D3T/D3W < 1.2$ (25)

The inequalities of conditions (19) to (22) are to properly set the refractive powers of the first to fourth lens units successively and have aims that when varying the magnification by moving the four lens units, the zoom ratio of about 3 can be easily obtained while seeking the shortening of the total length of the zoom lens and moreover that the variation of aberrations in varying the magnification is lessened to obtain a high optical performance over the entire range of variation of the magnification.

When the refractive power of each lens unit is too strong or too weak as exceeding the upper limit or the lower limit of the conditions (19) to (22), it becomes, in either case, difficult to correct the various aberrations such as spherical aberration, astigmatism and coma in good balance over the entire range of variation of the magnification.

The inequalities of conditions (23) to (25) are to properly set the air separations between the first lens unit and the second lens unit, between the second lens unit and the third lens unit, and between the third lens unit and the fourth lens unit in the wide-angle end and the telephoto end, and have aims that, while a shortening of the total length of the lens is attained under the conditions (19) to (22), a predetermined zoom ratio is obtained advantageously and that various aberrations are corrected in good balance over the entire range of variation of the magnification.

When the upper limit of the condition (23) is exceeded, the curvature of field comes to be over-corrected on the telephoto side. Also, when the lower limit is exceeded, it is no good because the curvature of field comes to vary in the direction of under-correction when varying the magnification from the wide-angle end to the telephoto end.

When the upper limit of the condition (24) is exceeded, the variation of the separation between the second lens unit and the third lens unit in varying the magnification is too small so that it becomes difficult to obtain the predetermined zoom ratio. Also, when the lower limit is exceeded, it is no good because the separation between the second lens unit and the third lens unit becomes too narrow on the telephoto side and these units come to be liable to mechanically interfere with each other.

When the upper limit of the condition (25) is exceeded, the separation between the third lens unit and the fourth lens unit becomes too large on the telephoto side and the size of the whole lens system comes to increase. Also, when the lower limit is exceeded, the variation of spherical aberration with variation of the magnification becomes large and this becomes difficult to correct well.

Also, in the invention, as shown in numerical examples 5 and 6 to be described later, aspheric surfaces are respectively applied to the lens surface on the object side of the negative lens of the first lens unit, the lens surface on the image side of the positive lens of the second lens unit and the lens surface on the image side of the positive lens of the third lens unit to well correct the variation of aberrations with variation of the magnification to obtain a high optical performance over the entire range of variation of the magnification.

Next, numerical examples 5 and 6 of the invention are shown. Also, the relationship of the above-described conditions (19) to (25) with the various numerical values in the numerical examples 5 and 6 is shown in Table-3.

Numerical Example 5 (FIGS. 10(A), 10(B), 10(C), 12(A), 12(B) and 12(C))

$F = 36.1 - 101.5$    $FNo = 4.1 - 8.8$    $2\omega = 61.7° - 24.1°$

| | | | |
|---|---|---|---|
| R 1 = 21.03 | D 1 = 1.5 | N 1 = 1.68893 | $\nu$ 1 = 31.1 |
| R 2 = 15.51 | D 2 = Variable | | |
| R 3 = 149.21 | D 3 = 3.0 | N 2 = 1.49700 | $\nu$ 2 = 81.6 |
| R 4 = −13.04 | D 4 = 1.0 | | |
| R 5 = Stop | D 5 = Variable | | |
| R 6 = −67.52 | D 6 = 3.3 | N 3 = 1.54814 | $\nu$ 3 = 45.8 |
| R 7 = −23.00 | D 7 = Variable | | |
| R 8 = −14.18 | D 8 = 1.7 | N 4 = 1.77250 | $\nu$ 4 = 49.6 |
| R 9 = 1945.58 | | | |

| Focal | Variable Separation | | |
|---|---|---|---|
| Length | D 2 | D 5 | D 7 |
| 36.10 | 9.61 | 17.57 | 3.88 |
| 63.73 | 9.55 | 7.79 | 3.98 |
| 101.51 | 9.03 | 2.81 | 4.17 |

Aspheric Surfaces:

| | |
|---|---|
| R 1: A = 0 | B = $-6.51 \times 10^{-5}$ |
| C = $-4.22 \times 10^{-7}$ | D = $-3.92 \times 10^{-9}$ |
| E = $-4.74 \times 10^{-12}$ | |
| R 4: A = 0 | B = $1.95 \times 10^{-5}$ |
| C = $-9.05 \times 10^{-9}$ | D = 0 |
| E = 0 | |
| R 7: A = 0 | B = $-3.43 \times 10^{-5}$ |
| C = $1.71 \times 10^{-8}$ | D = $-4.62 \times 10^{-10}$ |
| E = $-2.93 \times 10^{-12}$ | |

Numerical Example 6 (FIGS. 11(A), 11(B), 11(C), 13(A), 13(B) and 13(C))

$F = 36.2 - 101.5$    $FNo = 4.1 - 8.8$    $2\omega = 61.7° - 24.1°$

| | | | |
|---|---|---|---|
| R 1 = 23.31 | D 1 = 1.5 | N 1 = 1.84666 | $\nu$ 1 = 23.9 |
| R 2 = 18.89 | D 2 = Variable | | |
| R 3 = 205.40 | D 3 = 3.0 | N 2 = 1.49700 | $\nu$ 2 = 81.6 |
| R 4 = −13.50 | D 4 = 1.0 | | |
| R 5 = Stop | D 5 = Variable | | |
| R 6 = −52.87 | D 6 = 3.0 | N 3 = 1.59551 | $\nu$ 3 = 39.2 |
| R 7 = −23.21 | D 7 = Variable | | |
| R 8 = −14.43 | D 8 = 1.7 | N 4 = 1.77250 | $\nu$ 4 = 49.6 |
| R 9 = 45551.80 | | | |

| Focal | Variable Separation | | |
|---|---|---|---|
| Length | D 2 | D 5 | D 7 |
| 36.20 | 9.77 | 17.76 | 3.98 |
| 63.95 | 9.61 | 7.81 | 4.16 |
| 101.51 | 8.95 | 2.97 | 4.27 |

Aspheric Surfaces:

| | |
|---|---|
| R 1: A = 0 | B = $-4.83 \times 10^{-5}$ |
| C = $-2.41 \times 10^{-7}$ | D = $-3.14 \times 10^{-9}$ |
| E = $-1.78 \times 10^{-12}$ | |
| R 4: A = 0 | B = $2.05 \times 10^{-5}$ |
| C = $-1.82 \times 10^{-8}$ | D = 0 |
| E = 0 | |
| R 7 A = 0 | B = $-3.1 \times 10^{-5}$ |
| C = $7.72 \times 10^{-8}$ | D = $-1.73 \times 10^{-9}$ |
| E = $4.32 \times 10^{-12}$ | |

TABLE-3

| Condition | Numerical Example | |
|---|---|---|
| | 5 | 6 |
| (19) F1/FW | −2.67 | −3.86 |
| (20) F2/FW | 0.67 | 0.71 |
| (21) F3/FW | 1.72 | 1.85 |
| (22) F4/FW | −0.50 | −0.52 |
| (23) D1T/D1W | 0.94 | 0.92 |
| (24) D2T/D2W | 0.22 | 0.22 |
| (25) D3T/D3W | 1.07 | 1.07 |

According to the invention, as has been described above, by specifying the refractive powers of the three or four lens units and the lens arrangement, a zoom lens with the entire lens system minimized in size, having a zoom ratio of about 2-3 and a good optical performance over the entire range of variation of the magnification can be achieved.

I claim:

1. A zoom lens system comprising:
from an object side to an image side,
a first lens unit having a negative refractive power and consisting of a lens of meniscus form having a convex surface facing the object side;
a second lens unit having a positive refractive power and consisting of a lens having a strong refractive surface facing the image side; and
a third lens unit having a negative refractive power and consisting of two or less lenses,
zooming from a wide-angle end to a telephoto end being performed by varying a lens separation of each successive two of said first, second and third lens units, wherein
letting the focal length of an i-th lens unit be denoted by Fi, and the focal length of the entire lens system in the wide-angle end be denoted by FW, the following condition is satisfied: $-5 < F1/FW < -3$.

2. A zoom lens according to claim 1, wherein said third lens unit has a positive lens of meniscus form having a convex surface facing the image side and a negative lens having a strong refractive surface facing the object side as compared with the image side.

3. A zoom lens according to claim 2, wherein an aspheric surface is applied to the lens surface on the object side of the lens of said first lens unit, an aspheric surface to the lens surface on the image side of the lens of said second lens unit, and an aspheric surface to the lens surface on the image side of the positive lens of said third lens unit, and, letting aspheric coefficients of fourth order of the aspheric surfaces of these lenses by B1, B2 and B31, respectively, and the diagonal length of an effective picture plane by Y, the following conditions are satisfied:

$$-7 < B1 \cdot Y^3 < -2$$

$$1 < B2 \cdot Y^3 < 3$$

$$-3 < B31 \cdot Y^3 < -1.$$

4. A zoom lens according to claim 1, wherein letting the back focal distances in the wide-angle end and the telephoto end be denoted by SKW and SKT, respectively, an average value of the refractive indices of the materials of the negative lens of said first lens unit and the negative lens of said third lens unit be denoted by $\overline{nN}$, and the Abbe number of the material of the lens of the second lens unit be denoted by $\nu 2$, the following conditions are satisfied:

$$1.1 < (SKT\text{-}SKW)/FW < 1.9$$
$$[-5 < F1/FW < -3]$$
$$-1 < F2/F3 < -0.8$$

$$1.75 < \overline{nN} < 1.9$$
$$75 < \nu 2 < 85$$

5. A zoom lens according to claim 1, wherein a flare stop is arranged between said second lens unit and said third lens unit and is arranged to move while depicting a locus of convex shape toward the image side during the zooming from the wide-angle end to the telephoto end, and, letting the separations between said flare stop and said second lens unit in the wide-angle end and the telephoto end be denoted by D5W and D5T, respectively, the following condition is satisfied:

$$0.03 < D5W/D5T < 0.9.$$

6. A zoom lens according to claim 5, wherein letting intervals between principal points of the i-th lens unit and an (i+1)st lens unit in the wide-angle end and the telephoto end be denoted by EiW and EiT, respectively, the following conditions are satisfied:

$$-2.8 < F1/FW < -1.3$$
$$0.09 < E1W/FW < 0.25$$
$$-1 < F2/F3 < -0.6$$
$$-0.3 < (E1W\text{-}E1T)/(E2W\text{-}E2T) < 0.2$$

7. A zoom lens according to claim 6, wherein each of said three lens units is constructed from a single lens, and, letting the refractive index and Abbe number of the material of the lens of the i-th lens unit be denoted by Ni and $\nu i$, respectively, the following conditions are satisfied:

$$0.16 < ((N1+N3)/2 - N2 < 0.45$$

$$\nu 1 < \nu 3 < \nu 2.$$

8. A zoom lens according to claim 6, wherein an aspheric surface is applied to the lens surface on the object side of said first lens unit, an aspheric surface to the lens surface on the image side of said second lens unit, and an aspheric surface to the lens surface on the object side of said third lens unit, and, letting an aspheric coefficient of fourth order of the aspheric surface of the i-th lens unit be denoted by Bi and the diagonal length of an effective picture plane by Y, the following conditions are satisfied:

$$-15 < B1 \cdot Y^3 < -1$$

$$-7 < B2 \cdot Y^3 < -0.1$$

$$|B3 \cdot Y^3| < 2.$$

9. A zoom lens system comprising:
from an object side to an image side,
a first single lens having a negative refractive power;
a second single lens having a positive refractive power,
a third single lens having a negative refractive power; and
a fourth single lens having a negative refractive power,
variation of the magnification being performed by varying each lens separation, wherein
letting the focal length of an i-th lens be denoted by Fi, the focal length of the entire lens system in the wide-angle end be denoted by FW, air separations between the i-th lens and an (i+1)st lens in the wide-angle end and the telephoto lens be denoted by DiW and DiT, respectively, $$0.1 < D2T/D2W < 0.4.$$

10. A zoom lens according to claim 9, wherein zooming from a wide-angle end to a telephoto end is performed by moving each lens toward the object side.

11. A zoom lens according to claim 10, wherein the following conditions are satisfied:

$$-4 < F1/FW < -2.3$$
$$0.5 < F2/FW < 0.8$$
$$1.6 < F3/FW < 2$$
$$-0.6 < F4/FW < -0.4$$
$$0.8 < D1T/D1W < 1.1$$
$$0.1 < D2T/D2W < 0.4$$
$$1 < D3T/D3W < 1.2$$

12. A zoom lens comprising, from an object side to an image side, a first lens unit of negative refractive power, a second lens unit of positive refractive power and a third lens unit of negative refractive power, said first, second and third lens units being made to move up perform variation of the magnification, an aperture stop being arranged between said first lens unit and said second lens unit, a flare stop being arranged between said second lens unit and said third lens unit to move while depicting a locus of convex shape toward the image side, during variation of the magnification from a wide-angle end to a telephoto end, and, letting separations between said flare stop and said second lens unit in the wide-angle end and the telephoto end be denoted by D5W and D5T, respectively, the following condition being satisfied:

$$0.03 < D5W/D5T < 0.9.$$

13. A zoom lens according to claim 12, wherein letting the focal length of the i-th lens unit by Fi, the focal length of the entire lens system in the wide-angle end by FW and intervals between principal points of the i-th lens unit and the (i+1)st lens unit in the wide-angle end and the telephoto end by EiW and EiT, respectively, the following conditions are satisfied:

$$-2.8 < F1/FW < -1.3$$
$$0.09 < e1W/FW < 0.25$$
$$-1 < F2/F3 < -0.6$$
$$-0.3 < (E1W\text{-}E1T)/(E2W\text{-}E2T) < 0.2$$

14. A zoom lens according to claim 12, wherein each of said first, second and third lens units is constructed from a single lens, and, letting the refractive index and Abbe number of the material of the lens of the i-th lens unit be denoted by Ni and $\nu$i, respectively, the following conditions are satisfied:

$$0.16 < (N1+N3)/2 - N2 < 0.45$$

$$\nu 1 < \nu 3 < \nu 2.$$

15. A zoom lens system comprising:
from an object side to an image side,
a first lens unit of a negative refractive power and comprising a meniscus lens having a convex surface facing the object side;
a second lens unit of positive refractive power and comprising a lens having a strong refractive surface facing the image side; and
a third lens unit having a negative refractive power and comprising less than two lens components;
wherein zooming from a wide-angle end to a telephoto end is performed by varying lens separations between successive two of said first, second and third lens units, so that the following condition is satisfied:

$$-0.3 < (E1w - E1T)/(E2w - E2T) < 0.2$$

with E1w and E1T representing air spaces between the first lens unit and the second lens unit respectively at a wide-angle end and at a telephoto end, and E2w and E2T representing air spaces between the second lens unit and the third lens unit respectively at the wide-angle end and at the telephoto end.

16. A zoom lens according to claim 15, wherein letting the focal length of the i-th lens unit be denoted by F1, the focal length of the entire lens system in the wide-angle end by FW, respectively, the following conditions also are satisfied:

$$-2.8 < F1/FW < -1.3$$

$$0.9 < E1W/FW < 0.25$$

$$-1 < F2/F3 < -0.6.$$

17. A zoom lens according to claim 16, wherein each of said first, second and third lens units is constructed from a single lens component, wherein the refractive index and Abbe number of the material of the lens of the i-th lens unit are denoted by N1 and V1, respectively, the following conditions are satisfied:

$$0.16 < (N1+N3)/2 - N2 < 0.45$$

$$\nu 1 < \nu 3 < \nu 2.$$

18. A zoom lens according to claim 16, wherein an aspheric surface is applied to the lens surface on the object side of said first lens unit, an aspheric surface is applied to the lens surface on the image side of said second lens unit, and an aspheric surface is applied to the lens surface on the object side of said third lens unit, wherein an aspheric coefficient of fourth order of the aspheric surface of the i-th lens unit be denoted by Bl and the diagonal length of an effective picture plane is denoted by Y, the following conditions are satisfied:

$$-15 < B1 \cdot Y^3 < -1$$

$$-7 < B2 \cdot Y^3 < -0.1$$

$$|B3 \cdot Y^3| < 2.$$

* * * * *

UNITED STATES PATENT AND TRADEMARK OFFICE
CERTIFICATE OF CORRECTION

PATENT NO. : 5,274,504
DATED : December 28, 1993
INVENTOR(S) : YOSHINORI ITOH

It is certified that error appears in the above-indentified patent and that said Letters Patent is hereby corrected as shown below:

TITLE PAGE
    At [63], "Sep. 5, 1993," should read --Sep. 5, 1991--.

COLUMN 1
    Line 5, "1993" should read --1993,--.

COLUMN 2
    Line 28, "(A)," should read --4(A),--.
    Line 30, "(B)," should read --9(B),--.
    Line 31, "2(C)," should read --12(C),--.

COLUMN 15
    Line 35, "by" should read --be denoted by--.
    Line 56, "[-5<F1/FW<-3]" should be deleted.

COLUMN 16
    Line 50, "negative" should read --positive--.
    Line 61, "telephoto lens" should read --telephoto end--.
    Line 62, "respectively," should read --respectively, the following condition is satisfied:--.

COLUMN 17
    Line 15, "move up" should read --move to--.
    Line 32, "by" should read --be denoted by--.
    Line 40, "0.09<e1W/FW<0.25" should read --0.09<E1W/FW<0.25--.
    Line 55, "system" should be deleted.

UNITED STATES PATENT AND TRADEMARK OFFICE
CERTIFICATE OF CORRECTION

PATENT NO. : 5,274,504

DATED : December 28, 1993

INVENTOR(S) : YOSHINORI ITOH

It is certified that error appears in the above-indentified patent and that said Letters Patent is hereby corrected as shown below:

<u>COLUMN 18</u>
   Line 36, "V1," should read "$\nu$1,--.
   Line 49, "be" should read --is--.

Signed and Sealed this

Fourth Day of October, 1994

*Attest:*

BRUCE LEHMAN

*Attesting Officer*   *Commissioner of Patents and Trademarks*